US011118895B2

(12) United States Patent
Ishigaki et al.

(10) Patent No.: US 11,118,895 B2
(45) Date of Patent: Sep. 14, 2021

(54) THREE-DIMENSIONAL MEASUREMENT DEVICE

(71) Applicant: CKD CORPORATION, Aichi (JP)

(72) Inventors: Hiroyuki Ishigaki, Aichi (JP); Takahiro Mamiya, Aichi (JP)

(73) Assignee: CKD CORPORATION, Aichi (JP)

( * ) Notice: Subject to any disclaimer, the term of this patent is extended or adjusted under 35 U.S.C. 154(b) by 0 days.

(21) Appl. No.: 16/874,222

(22) Filed: May 14, 2020

(65) Prior Publication Data

US 2020/0271434 A1 Aug. 27, 2020

Related U.S. Application Data

(63) Continuation of application No. PCT/JP2018/031883, filed on Aug. 29, 2018.

(30) Foreign Application Priority Data

Dec. 7, 2017 (JP) .............................. JP2017-234859

(51) Int. Cl.
*G01B 9/021* (2006.01)
*G01B 9/02* (2006.01)

(52) U.S. Cl.
CPC ......... *G01B 9/021* (2013.01); *G01B 9/02047* (2013.01); *G01B 9/02083* (2013.01)

(58) Field of Classification Search
CPC ................ G01B 9/021; G01B 9/02047; G01B 9/02083; G01B 2290/70; G01B 9/02007;
(Continued)

(56) References Cited

U.S. PATENT DOCUMENTS

| 5,777,742 A | 7/1998 | Marron |
| 2008/0137933 A1* | 6/2008 | Kim ...................... G03H 1/0866 382/131 |
| 2010/0181462 A1* | 7/2010 | Sugita ................ G01B 9/02048 250/201.8 |

FOREIGN PATENT DOCUMENTS

| JP | 20009444 A | 1/2000 |
| JP | 2012083233 A | 4/2012 |

(Continued)

OTHER PUBLICATIONS

International Preliminary Report on Patentability Issued in corresponding International Application No. PCT/JP2018/031883, dated Jun. 9, 2020, with translation (15 pages).

(Continued)

*Primary Examiner* — Jonathan M Hansen
(74) *Attorney, Agent, or Firm* — Osha Bergman Watanabe & Burton LLP

(57) ABSTRACT

A three-dimensional measurement device includes: an optical system that splits incident light into two lights, radiates one of the two lights as measurement light to a measured object and the other of the two lights as reference light to a reference surface, and recombines the two lights into combined light to emit the combined light; a light emitter that emits predetermined light entering the predetermined optical system; an imaging system that takes an image of output light emitted from the optical system; and an image processor that performs three-dimensional measurement of a predetermined measurement area of the measured object based on an interference fringe image obtained by the imaging system. The image processor obtains intensity image data at a predetermined position along an optical axis direction at each coordinate position in the measurement area by reconstruction based on an interference fringe image of the measurement area.

24 Claims, 10 Drawing Sheets

(58) Field of Classification Search
CPC .. G01B 2210/56; G01B 11/2441; G06T 7/521
See application file for complete search history.

(56) References Cited

FOREIGN PATENT DOCUMENTS

| | | |
|---|---|---|
| JP | 2014001965 A | 1/2014 |
| JP | 2017053832 A | 3/2017 |
| JP | 2017125707 A | 7/2017 |

OTHER PUBLICATIONS

Tonooka, Masahito, et. al., "Surface Profile Measurement by Phase and Contrast Detection using Grating Projection Method", Journal of the Japan Society for Precision Engineering, vol. 66, No. 1, Jan. 5, 2000, pp. 132-136 (5 pages).
International Search Report issued in corresponding International Application No. PCT/JP2018/031883, dated Oct. 23, 2018, with translation (5 pages).
Written Opinion issued in corresponding International Application No. PCT/JP2018/031883, dated Oct. 23, 2018 (4 pages).

\* cited by examiner

FIG. 11

In the case of measurement range of 1000 nm:

| Actual Height [nm] | Phase [°] | Order | Reconstructed Image Number | Luminance Values of Reconstructed Images Case 1 | Luminance Values of Reconstructed Images Case 2 |
|---|---|---|---|---|---|
| 3500 | 180 | | | | |
| 3250 | 90 | | | | |
| 3000 | 0 | 3 | $H_3$ ① | 135 | 64 |
| 2750 | −90 | | | | |
| 2500 | −180 | | | | |
| 2500 | 180 | | | | |
| 2250 | 90 | | | | |
| 2000 | 0 | 2 | $H_2$ ② | 250 | 128 |
| 1750 | −90 | | | | |
| 1500 | −180 | | | | |
| 1500 | 180 | | | | |
| 1250 | 90 | | | | |
| 1000 | 0 | 1 | $H_1$ ③ | 128 | 128 |
| 750 | −90 | | | | |
| 500 | −180 | | | | |
| 500 | 180 | | | | |
| 250 | 90 | | | | |
| 0 | 0 | 0 | $H_0$ ④ | 64 | 64 |
| −250 | −90 | | | | |
| −500 | −180 | | | | |
| −500 | 180 | | | | |
| −750 | 90 | | | | |
| −1000 | 0 | −1 | $H_{-1}$ ⑤ | 32 | 32 |
| −1250 | −90 | | | | |
| −1500 | −180 | | | | |
| −1500 | 180 | | | | |
| −1750 | 90 | | | | |
| −2000 | 0 | −2 | $H_{-2}$ ⑥ | 16 | 16 |
| −2250 | −90 | | | | |
| −2500 | −180 | | | | |
| −2500 | 180 | | | | |
| −2750 | 90 | | | | |
| −3000 | 0 | −3 | $H_{-3}$ ⑦ | 8 | 8 |
| −3250 | −90 | | | | |
| −3500 | −180 | | | | |

FIG. 12

In the case of measurement range of 1000 nm:

| Actual Height [nm] | Phase [°] | Order | Reconstructed Image Number | Luminance Values of Reconstructed Images Case 1 | Luminance Values of Reconstructed Images Case 2 |
|---|---|---|---|---|---|
| 3500 | 180 | 3 | | | |
| 3250 | 90 | | | | |
| 3000 | 0 | | $H_3$  ① | 135 | 64 |
| 2750 | -90 | | | | |
| 2500 | -180 | | | | |
| 2500 | 180 | 2 | | | |
| 2250 | 90 | | | | |
| 2000 | 0 | | $H_2$ | | |
| 1750 | -90 | | | | |
| 1500 | -180 | | | | |
| 1500 | 180 | 1 | | | |
| 1250 | 90 | | | | |
| 1000 | 0 | | $H_1$  ② | 128 | 128 |
| 750 | -90 | | | | |
| 500 | -180 | | | | |
| 500 | 180 | 0 | | | |
| 250 | 90 | | | | |
| 0 | 0 | | $H_0$ | | |
| -250 | -90 | | | | |
| -500 | -180 | | | | |
| -500 | 180 | -1 | | | |
| -750 | 90 | | | | |
| -1000 | 0 | | $H_{-1}$  ③ | 32 | 32 |
| -1250 | -90 | | | | |
| -1500 | -180 | | | | |
| -1500 | 180 | -2 | | | |
| -1750 | 90 | | | | |
| -2000 | 0 | | $H_{-2}$ | | |
| -2250 | -90 | | | | |
| -2500 | -180 | | | | |
| -2500 | 180 | -3 | | | |
| -2750 | 90 | | | | |
| -3000 | 0 | | $H_{-3}$  ④ | 8 | 8 |
| -3250 | -90 | | | | |
| -3500 | -180 | | | | |

THREE-DIMENSIONAL MEASUREMENT DEVICE

BACKGROUND

Technical Field

The present invention relates to a three-dimensional measurement device configured to measure the shape of a measured object.

Description of Related Art

Three-dimensional measurement devices using interferometers have been conventionally known as the three-dimensional measurement device configured to measure the shape of a measured object. Among them, there is a three-dimensional measurement device that performs measurement by a phase shift method, based on a plurality of interference fringe images having different phases (as described in, for example, Patent Literature 1).

In such a three-dimensional measurement device, half (for example, 750 nm) the wavelength of measurement light (for example, 1500 nm) is a measurement range (dynamic range) that allows for measurement.

In the case where the measured object has a height difference equal to or greater than half the wavelength of the measurement light, this provides an insufficient measurement range and is likely to fail to appropriately measure the shape of the measured object. The longer wavelength of the measurement light, on the other hand, reduces the resolution and is likely to decrease the measurement accuracy.

As a technique of measuring the height beyond the measurement range, there is a three-dimensional measurement device that uses low coherent light for a light source of a Michelson interferometer to localize the range where interference occurs, moves a stage of a focal point moving mechanism to obtain information for unwrapping (specification of order) from contrast information of interference fringes, and uses amplitude images and phase images obtained in predetermined steps by the focal point moving mechanism to calculate the shape (as described in, for example, Patent Literature 2).

PATENT LITERATURE

Patent Literature 1: JP 2017-53832A
Patent Literature 2: JP 2000-9444A

SUMMARY

The prior art technique described in Patent Literature 2 allows for measurement of the height beyond the measurement range but requires the focal point moving mechanism. This is likely to complicate the structure.

This technique also requires multiple imaging operations with moving the measured object. This increases the measurement time and is also affected by the vibration of such moving and the like. This is likely to decrease the measurement accuracy.

One or more embodiments of the present invention provide a three-dimensional measurement device that improves the measurement accuracy and that also improves the measurement efficiency.

Functions and advantageous effects that are characteristic of one or more embodiments are also described as appropriate.

A three-dimensional measurement device of one or more embodiments comprises a predetermined optical system (specific optical system) configured to split predetermined incident light into two lights, to radiate one of the two lights as measurement light to a measured object (for example, a wafer substrate) and the other of the two lights as reference light to a reference surface, and to recombine the two lights to combined light and emit the combined light; an irradiation unit (or light emitter) configured to emit predetermined light that is made to enter the predetermined optical system; an imaging unit (or imaging system) configured to take an image of output light emitted from the predetermined optical system; and an image processor configured to perform three-dimensional measurement with regard to a predetermined measurement area of the measured object (an entire area or a partial area of the measured object), based on an interference fringe image (hologram) obtained by imaging by the imaging unit. The image processor comprises an image data obtaining unit configured to obtain intensity image data at a predetermined position in an optical axis direction with regard to each coordinate position in the measurement area by reconstruction based on an interference fringe image with regard to the measurement area obtained by imaging by the imaging unit; a phase information obtaining unit configured to obtain phase information of light at the predetermined position in the optical axis direction with regard to each coordinate position in the measurement area by reconstruction based on the interference fringe image with regard to the measurement area obtained by imaging by the imaging unit; a focusing determination unit configured to determine whether the intensity image data is in a focusing state that satisfies a predetermined condition (for example, a condition that the intensity image data has a luminance equal to or higher than a reference value), based on the intensity image data at the predetermined position in the optical axis direction with regard to a predetermined coordinate position in the measurement area obtained by the image data obtaining unit; an order specifying unit configured to specify an order corresponding to the predetermined position in the optical axis direction, as an order with regard to the predetermined coordinate position, among orders determined at predetermined measurement range intervals in the optical axis direction, when it is determined that the intensity image data at the predetermined position in the optical axis direction with regard to the predetermined coordinate position is in the focusing state, based on a determination result of the focusing determination unit; and a three-dimensional measurement unit configured to perform three-dimensional measurement (height measurement) with regard to the predetermined coordinate position, based on phase information with regard to the predetermined coordinate position obtained by the phase information obtaining unit and the order with regard to the predetermined coordinate position specified by the order specifying unit.

The "predetermined optical system" includes not only "an optical system that causes interference of the reference light and the measurement light inside thereof and outputs the reference light and the measurement light as interfering light" but "an optical system that outputs the reference light and the measurement light as simple combined light without causing interference of the reference light and the measurement light inside thereof". When the "output light" output from the "predetermined optical system" is "combined light", "interfering light" is to be obtained by means of a predetermined interfering unit in a stage at least prior to imaging by the "imaging unit", in order to take "interference fringe images".

Accordingly, an optical system configured to split predetermined incident light into two lights, to radiate one of the lights as measurement light to a measured object and the other of the lights as reference light to a reference surface, and to recombine the two lights to combined light and emit the combined light for the purpose of causing interference of lights (taking interference fringe images) may be called "interference optical system". Accordingly, in the embodiments described above, the "predetermined optical system (specific optical system)" may be regarded as "interference optical system" (the same applies to the embodiments described below).

The configuration of the above embodiments allows for height measurement beyond the measurement range with regard to each coordinate position in the measurement area. Furthermore, the configuration of the above embodiments does not require any large-scaled moving mechanism to move the measured object and thereby simplifies the structure. The configuration of the above embodiments is also not affected by the vibration or the like of such a large-scaled moving mechanism and thereby improves the measurement accuracy.

Moreover, the configuration of the above embodiments enables all the interference fringe images required for measurement to be obtained by the smaller number of imaging operations and thereby improves the measurement efficiency.

A three-dimensional measurement device of one or more embodiments comprises a predetermined optical system (specific optical system) configured to split predetermined incident light into two lights, to radiate one of the two lights as measurement light to a measured object (for example, a wafer substrate) and the other of the two lights as reference light to a reference surface, and to recombine the two lights to combined light and emit the combined light; an irradiation unit (or light emitter) configured to emit predetermined light that is made to enter the predetermined optical system; an imaging unit (or imaging system) configured to take an image of output light emitted from the predetermined optical system; and an image processor configured to perform three-dimensional measurement with regard to a predetermined measurement area of the measured object (an entire area or a partial area of the measured object), based on an interference fringe image (hologram) obtained by imaging by the imaging unit. The image processor comprises an image data obtaining unit configured to obtain multiple sets of intensity image data at a predetermined position in an optical axis direction with regard to each coordinate position in the measurement area by reconstruction based on an interference fringe image with regard to the measurement area obtained by imaging by the imaging unit, wherein the multiple sets of the intensity image data are obtained at predetermined measurement range intervals of a number n of periods in at least a predetermined range in the optical axis direction, (where n is a natural number equal to or greater than 1); a focusing position determination unit configured to determine a predetermined focusing position in the optical axis direction (for example, a position in the optical axis direction where intensity image data of the maximum focusing is obtained) with regard to a predetermined coordinate position in the measurement area, based on the multiple sets of the intensity image data with regard to the predetermined coordinate position obtained by the image data obtaining unit; an order specifying unit configured to specify an order corresponding to the focusing position in the optical axis direction with regard to the predetermined coordinate position determined by the focusing position determination unit, as an order with regard to the predetermined coordinate position, among orders determined at the measurement range intervals in the optical axis direction; a phase information obtaining unit configured to obtain phase information of light at the predetermined position in the optical axis direction with regard to each coordinate position in the measurement area by reconstruction based on the interference fringe image with regard to the measurement area obtained by imaging by the imaging unit; and a three-dimensional measurement unit configured to perform three-dimensional measurement (height measurement) with regard to the predetermined coordinate position, based on phase information with regard to the predetermined coordinate position obtained by the phase information obtaining unit and the order with regard to the predetermined coordinate position specified by the order specifying unit.

The configuration of the embodiments described above has similar functions and advantageous effects to those described above.

A three-dimensional measurement device of one or more embodiments comprises a predetermined optical system (specific optical system) configured to split predetermined incident light into two lights, to radiate one of the two lights as measurement light to a measured object (for example, a wafer substrate) and the other of the two lights as reference light to a reference surface, and to recombine the two lights to combined light and emit the combined light; an irradiation unit (or light emitter) configured to emit predetermined light that is made to enter the predetermined optical system; an imaging unit (or imaging system) configured to take an image of output light emitted from the predetermined optical system; and an image processor configured to perform three-dimensional measurement with regard to a predetermined measurement area of the measured object (an entire area or a partial area of the measured object), based on an interference fringe image (hologram) obtained by imaging by the imaging unit. The image processor comprises a first image data obtaining unit configured to obtain multiple sets of intensity image data at a predetermined position in an optical axis direction with regard to a specific area that is a preset part in the measurement area by reconstruction based on the interference fringe image obtained by imaging by the imaging unit, wherein the multiple sets of the intensity image data are obtained at predetermined measurement range intervals of a number n of periods in at least a first range in the optical axis direction, (where n is a natural number equal to or greater than 1); a first focusing position determination unit configured to determine a predetermined focusing position in the optical axis direction with regard to the specific area, based on the multiple sets of the intensity image data with regard to the specific area obtained by the first image data obtaining unit; a second image data obtaining unit configured to obtain multiple sets of intensity image data at the predetermined position in the optical axis direction with regard to each coordinate position in the measurement area by reconstruction based on the interference fringe image with regard to the measurement area obtained by imaging by the imaging unit, wherein the multiple sets of the intensity image data are obtained at predetermined measurement range intervals of a number n of periods in at least a second range in the optical axis direction, which is set on a basis of the focusing position in the optical axis direction in the specific area, (where n is a natural number equal to or greater than 1); a second focusing position determination unit configured to determine a predetermined focusing position in the optical axis direction with regard to a predetermined coordinate position in the measurement area, based on the multiple sets of the intensity image data with regard to the predetermined coordinate position obtained by the second image data obtaining unit; an order specifying unit configured to specify an order corresponding to the focusing position in the optical axis direction with regard to the predetermined coordinate position determined by the second focusing position determination unit, as an order with regard to the predetermined coordinate position, among orders determined at the measurement range intervals in the optical axis direction; a phase information obtaining unit configured to obtain phase information of light at the predetermined position in the optical axis direction with regard to each coordinate position in the measurement area by reconstruction based on the interference fringe image with regard to the measurement area obtained by imaging by the imaging unit; and a three-dimensional measurement unit configured to perform three-dimensional measurement (height measurement) with regard to the predetermined coordinate position, based on phase information with regard to the predetermined coordinate position obtained by the phase information obtaining unit and the order with regard to the predetermined coordinate position specified by the order specifying unit.

The configuration of the embodiments described above has similar functions and advantageous effects to those described above. Especially, the configuration does not initially obtain intensity image data with regard to the entire measurement area but obtains the intensity image data at multiple positions in the optical axis direction with regard to only a specific area that is a preset part in the measurement area (limited narrow range) and specifies the position of the measured object in the optical axis direction, based on the focusing state of the obtained intensity image data.

The configuration of the above embodiments subsequently obtains intensity image data at multiple positions in the optical axis direction with regard to each coordinate position in the entire measurement area, on the basis of the focusing position with regard to the specific area.

This configuration reduces the load of the process of obtaining the required data for three-dimensional measurement of the measurement area and shortens the time period required for this process. As a result, this configuration improves the measurement accuracy and also improves the measurement efficiency.

In three-dimensional measurement device described above, the reconstruction may be performed by obtaining complex amplitude data with regard to the predetermined position in the optical axis direction, based on the interference fringe image.

The three-dimensional measurement device described above may further comprise a phase shift unit (or polarizer) configured to provide a relative phase difference between the reference light and the measurement light. The image processor may be configured to perform measurement with regard to a predetermined measurement area of the measured object, based on multiple interference fringe images obtained by the imaging unit that takes images of the output light subjected to multiple different phase shifts (for example, three or four different phase shifts) by the phase shift unit.

In the three-dimensional measurement device described above, the irradiation unit may comprise a first irradiation unit (or first light emitter) configured to emit first light that includes polarized light of a first wavelength and that is made to enter the predetermined optical system; and a second irradiation unit (or second light emitter) configured to emit second light that includes polarized light of a second wavelength and that is made to enter the predetermined optical system. The imaging unit may comprise a first imaging unit (or first imaging system) configured to take an image of output light with regard to the first light that is emitted from the predetermined optical system when the first light enters the predetermined optical system; and a second imaging unit (or second imaging system) configured to take an image of output light with regard to the second light that is emitted from the predetermined optical system when the second light enters the predetermined optical system.

Like the embodiments described above, using two different lights having different wavelengths can expand the measurement range.

The "first light" emitted from the "first irradiation unit (or first light emitter)" may be any light including at least "polarized light of the first wavelength (first polarized light)" and may be light (for example, "non-polarized light" or "circularly polarized light") including another extra component that is to be subsequently cut in the "predetermined optical system".

Similarly, the "second light" emitted from the "second irradiation unit (or second light emitter)" may be any light including at least "polarized light of the second wavelength (second polarized light)" and may be light (for example, "non-polarized light" or "circularly polarized light") including another extra component that is to be subsequently cut in the "predetermined optical system".

The "output light with regard to the first light" output from the "predetermined optical system (specific optical system)" includes "combined light of reference light and measurement light with regard to the first light or interfering light obtained by interference of the combined light". The "output light with regard to the second light" includes "combined light of reference light and measurement light with regard to the second light or interfering light obtained by interference of the combined light".

In the three-dimensional measurement device described above, the measured object may be a wafer substrate with a bump formed thereon.

The configuration of the above embodiments allows for measurement of bumps formed on a wafer substrate. This configuration also enables the good/poor quality judgment of the bumps to be performed, based on the measurement values in inspection of the bumps. This accordingly allows for the good/poor quality judgment with high accuracy by providing the functions and the advantageous effects described above. As a result, this configuration improves the inspection accuracy and the inspection efficiency in a bump inspection device.

BRIEF DESCRIPTION OF DRAWINGS

FIG. 11 is a diagram illustrating one concrete example of relationships among a measurement range, phases, orders, height measurement values and the like, according to one or more embodiments; and FIG. 12 is a diagram illustrating one concrete example of relationships among a measurement range, phases, orders, height measurement values and the like, according to one or more embodiments.

DETAILED DESCRIPTION OF EMBODIMENTS

The following describes embodiments of a three-dimensional measurement device with reference to the drawings. The three-dimensional measurement device of one or more embodiments is a measurement device configured to perform three-dimensional measurement using digital holography. The "digital holography" herein denotes a technique of obtaining an interference fringe image (hologram) and reconstructing an image from the obtained interference fringe image.

Figure 1:
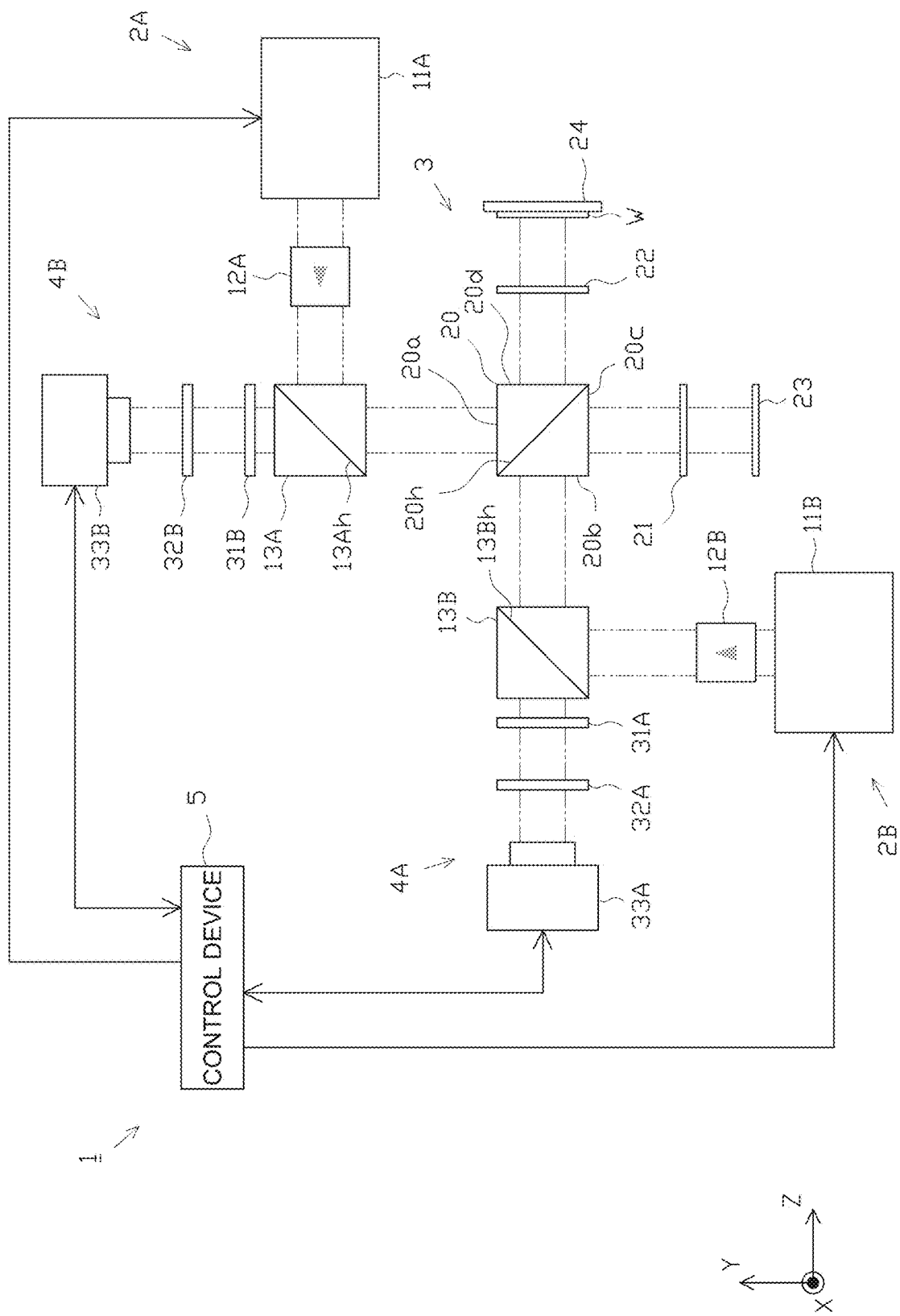
FIG. 1 is a schematic configuration diagram illustrating a three-dimensional measurement device according to one or more embodiments.
Figure 2:
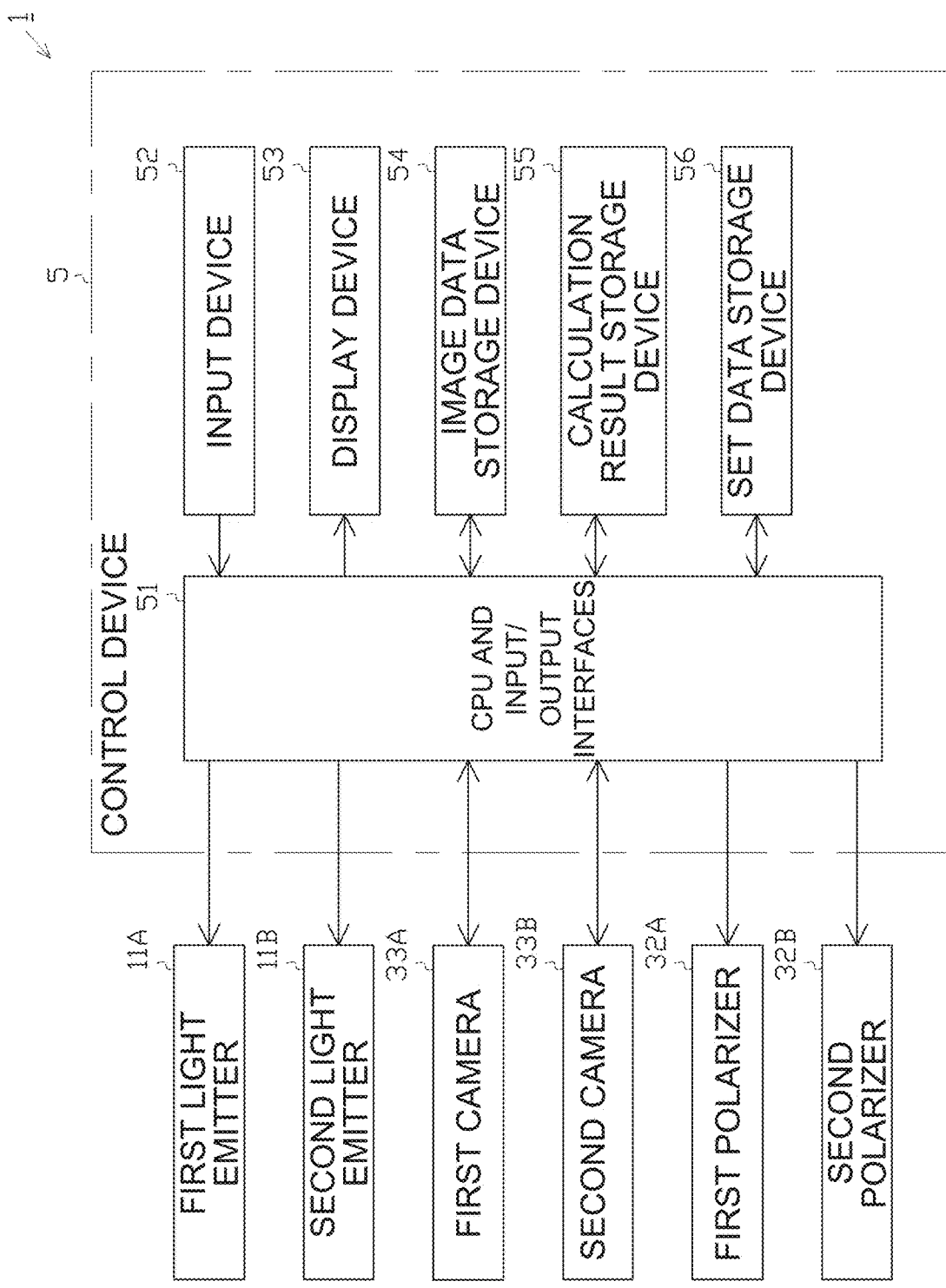
FIG. 2 is a block diagram illustrating the electrical configuration of the three-dimensional measurement device according to one or more embodiments.

FIG. 1 is a diagram illustrating the schematic configuration of a three-dimensional measurement device 1 according to one or more embodiments. FIG. 2 is a block diagram illustrating the electrical configuration of the three-dimensional measurement device 1. In the description below, as a matter of convenience, a front-back direction of the sheet surface of FIG. 1 is called "X-axis direction", a top-bottom direction of the sheet surface is called "Y-axis direction" and a left-right direction of the sheet surface is called "Z-axis direction".

The three-dimensional measurement device 1 is configured based on the principle of a Michelson interferometer and includes two projection optical systems 2A and 2B (a first projection optical system 2A and a second projection optical system 2B) configured as the irradiation units to output lights of specific wavelengths; an interference optical system 3 which the lights respectively emitted from the projection optical systems 2A and 2B enter; two imaging systems 4A and 4B (a first imaging system 4A and a second imaging system 4B) configured as the imaging units to take images of the lights emitted from the interference optical system 3; and a control device 5 configured to perform various controls, image processing, calculations and the like involved in the projection optical systems 2A and 2B, the interference optical system 3, the imaging systems 4A and 4B and the like.

The "control device 5" is configured as the "image processor" according to one or more embodiments, and the "interference optical system 3" is configured as the "predetermined optical system (specific optical system)" according to one or more embodiments. According to one or more embodiments, the "interference optical system" denotes an optical system configured to split predetermined incident light into two lights (measurement light and reference light), to provide the two lights with an optical path difference, to recombine the two lights and to output the combined light, with a view to causing interference of light (taking an interference fringe image). In other words, the "interference optical system" denotes not only an optical system that internally causes interference of two lights and outputs the interfering light but an optical system that simply combines two lights and outputs the combined light without internally causing interference of the two lights. Accordingly, as described later in one or more embodiments, when two lights (measurement light and reference light) are output from the "interference optical system" as the combined light without interference, interfering light is obtained by means of a predetermined interfering unit in at least a stage prior to imaging (for example, inside of the imaging system).

The configuration of the two projection optical systems 2A and 2B (the first projection optical system 2A and the second projection optical system 2B) is described first in detail. The first projection optical system 2A includes, for example, a first light emitter 11A, a first light isolator 12A and a first non-polarizing beam splitter 13A. The "first light emitter 11A" is configured as the "first irradiation unit" according to one or more embodiments.

Although not being illustrated, the first light emitter 11A includes, for example, a laser light source configured to output linearly polarized light of a specific wavelength $\lambda_1$; a beam expander configured to expand the linearly polarized light output from the laser light source and emit the expanded light as parallel light; a polarizer configured to adjust the intensity; and a half wave plate configured to adjust the polarizing direction.

According to the configuration of one or more embodiments, linearly polarized light of the wavelength $\lambda_1$ (for example, $\lambda_1$=1500 nm) having a polarizing direction that is a direction inclined at 45 degrees to the X-axis direction and the Y-axis direction is emitted leftward in the Z-axis direction from the first light emitter 11A. The "wavelength $\lambda_1$" corresponds to the "first wavelength" according to one or more embodiments. Hereinafter the light of the wavelength $\lambda_1$ emitted from the first light emitter 11A is called "first light".

The first light isolator 12A is an optical element configured to transmit only a light traveling in one direction (leftward in the Z-axis direction according to one or more embodiments) but block a light traveling in a reverse direction (rightward in the Z-axis direction according to one or more embodiments). This configuration allows for transmission of only the first light emitted from the first light emitter 11A and thereby prevents damage and destabilization of the first light emitter 11A caused by return light.

The first non-polarizing beam splitter 13A is a cube-shaped known optical member configured by joining right angle prisms (triangular prisms having a bottom face in an isosceles right triangle shape: the same applies hereinafter) together to be integrated, and its joint surface 13Ah is coated with, for example, a metal film. The "first non-polarizing beam splitter 13A" is configured as the "first light guiding unit" according to one or more embodiments.

The non-polarizing beam splitter is configured to split the incident light including the polarization state into a transmitted light and a reflected light at a predetermined ratio. The same applies hereinafter. According to one or more embodiments, a half mirror having a 1:1 split ratio is employed as the non-polarizing beam splitter. More specifically, the half mirror splits the incident light to provide a P-polarized light component and an S-polarized light component of the transmitted light and a P-polarized light component and an S-polarized light component of the reflected light all at identical rates and provide the respective polarization states of the transmitted light and the reflected light that are identical with the polarization state of the incident light.

According to one or more embodiments, linearly polarized light having a polarizing direction that is a direction parallel to the sheet surface of FIG. 1 (the Y-axis direction or the Z-axis direction) is called P-polarized light (P-polarized light component). Linearly polarized light having a polarizing direction that is the X-axis direction perpendicular to the sheet surface of FIG. 1 is called S-polarized light (S-polarized light component).

The first non-polarizing beam splitter 13A is arranged such that one of two surfaces adjoining to each other across the joint surface 13Ah is perpendicular to the Y-axis direction and the other of the two surfaces is perpendicular to the Z-axis direction. In other words, the joint surface 13Ah of the first non-polarizing beam splitter 13A is arranged to be inclined at 45 degrees to the Y-axis direction and the Z-axis direction. More specifically, the first non-polarizing beam splitter 13A is arranged to transmit part (half) of the first light that enters leftward in the Z-axis direction from the first light emitter 11A via the first light isolator 12A, leftward in the Z-axis direction and reflect the remaining part (remaining half) of the first light downward in the Y-axis direction.

Like the first projection optical system 2A described above, the second projection optical system 2B includes, for example, a second light emitter 11B, a second light isolator 12B and a second non-polarizing beam splitter 13B. The "second light emitter 11B" is configured as the "second irradiation unit" according to one or more embodiments.

Like the first light emitter 11A described above, the second light emitter 11B includes, for example, a laser light source configured to output linearly polarized light of a specific wavelength $\lambda_2$; a beam expander configured to expand the linearly polarized light output from the laser light source and emit the expanded light as parallel light; a polarizer configured to adjust the intensity; and a half wave plate configured to adjust the polarizing direction.

According to the configuration of one or more embodiments, linearly polarized light of the wavelength $\lambda_2$ (for example, $\lambda_2$=1503 nm) having a polarizing direction that is a direction inclined at 45 degrees to the X-axis direction and the Z-axis direction is emitted upward in the Y-axis direction from the second light emitter 11B. The "wavelength $\lambda_2$" corresponds to the "second wavelength" according to one or more embodiments. Hereinafter the light of the wavelength $\lambda_2$ emitted from the second light emitter 11B is called "second light".

Like the first light isolator 12A, the second light isolator 12B is an optical element configured to transmit only a light traveling in one direction (upward in the Y-axis direction according to one or more embodiments) but block a light traveling in a reverse direction (downward in the Y-axis direction according to one or more embodiments). This configuration allows for transmission of only the second light emitted from the second light emitter 11B and thereby prevents damage and destabilization of the second light emitter 11B caused by return light.

Like the first non-polarizing beam splitter 13A, the second non-polarizing beam splitter 13B is a cube-shaped known optical member configured by joining right angle prisms together to be integrated, and its joint surface 13Bh is coated with, for example, a metal film. The "second non-polarizing beam splitter 13B" is configured as the "second light guiding unit" according to one or more embodiments.

The second non-polarizing beam splitter 13B is arranged such that one of two surfaces adjoining to each other across the joint surface 13Bh is perpendicular to the Y-axis direction and the other of the two surfaces is perpendicular to the Z-axis direction. In other words, the joint surface 13Bh of the second non-polarizing beam splitter 13B is arranged to be inclined at 45 degrees to the Y-axis direction and the Z-axis direction. More specifically, the second non-polarizing beam splitter 13B is arranged to transmit part (half) of the second light that enters upward in the Y-axis direction from the second light emitter 11B via the second light isolator 12B, upward in the Y-axis direction and reflect the remaining part (remaining half) of the second light rightward in the Z-axis direction.

The following describes the configuration of the interference optical system 3 in detail. The interference optical system 3 includes, for example, a polarizing beam splitter (PBS) 20, quarter wave plates 21 and 22, a reference surface 23, and a placement structure 24.

The polarizing beam splitter 20 is a cube-shaped known optical member configured by joining right angle prisms together to be integrated, and its joint surface (boundary surface) 20h is coated with, for example, a dielectric multilayer film.

The polarizing beam splitter 20 is configured to split a linearly polarized incident light into two polarized light components (a P-polarized light component and an S-polarized light component) having polarizing directions perpendicular to each other. According to one or more embodiments, the polarizing beam splitter 20 is configured to transmit the P-polarized light component and reflect the S-polarized light component.

The polarizing beam splitter 20 is arranged such that one of two surfaces adjoining to each other across the joint surface 20h is perpendicular to the Y-axis direction and the other of the two surfaces is perpendicular to the Z-axis direction. In other words, the joint surface 20h of the polarizing beam splitter 20 is arranged to be inclined at 45 degrees to the Y-axis direction and the Z-axis direction.

More specifically, a first surface (upper side face in the Y-axis direction) 20a of the polarizing beam splitter 20, which the first light reflected downward in the Y-axis direction from the first non-polarizing beam splitter 13A enters, and a third surface (lower side face in the Y-axis direction) 20c opposed to the first surface 20a are arranged to be perpendicular to the Y-axis direction. The "first surface 20a of the polarizing beam splitter 20" corresponds to the "first input-output element" according to one or more embodiments.

On the other hand, a second surface (left side face in the Z-axis direction) 20b of the polarizing beam splitter 20, which is a surface adjoining to the first surface 20a across the joint surface 20h and which the second light reflected rightward in the Z-axis direction from the second non-polarizing beam splitter 13B enters, and a fourth surface (right side face in the Z-axis direction) 20d opposed to the second surface 20b are arranged to be perpendicular to the Z-axis direction. The "second surface 20b of the polarizing beam splitter 20" corresponds to the "second input-output element" according to one or more embodiments.

The quarter wave plate 21 is arranged to be opposed in the Y-axis direction to the third surface 20c of the polarizing beam splitter 20. The reference surface 23 is arranged to be opposed in the Y-axis direction to the quarter wave plate 21.

The quarter wave plate 21 serves to convert linearly polarized light into circularly polarized light and to convert circularly polarized light into linearly polarized light. Accordingly, the linearly polarized light (reference light) emitted from the third surface 20c of the polarizing beam splitter 20 is converted into circularly polarized light by means of the quarter wave plate 21 and is then radiated to the reference surface 23. The reference light reflected by the reference surface 23 is reconverted from the circularly polarized light into linearly polarized light by means of the quarter wave plate 21 and reenters the third surface 20c of the polarizing beam splitter 20.

The quarter wave plate 22 is, on the other hand, arranged to be opposed in the Z-axis direction to the fourth surface 20d of the polarizing beam splitter 20. The placement structure 24 is arranged to be opposed in the Z-axis direction to the quarter wave plate 22.

The quarter wave plate 22 serves to convert linearly polarized light into circularly polarized light and to convert circularly polarized light into linearly polarized light. Accordingly, the linearly polarized light (measurement light) emitted from the fourth surface 20d of the polarizing beam splitter 20 is converted into circularly polarized light by means of the quarter wave plate 22 and is then radiated to a work W as a measured object placed on the placement structure 24. The measurement light reflected by the work W is reconverted from the circularly polarized light into linearly polarized light by means of the quarter wave plate 22 and reenters the fourth surface 20d of the polarizing beam splitter 20.

The following describes the configuration of the two imaging systems 4A and 4B (the first imaging system 4A and the second imaging system 4B) in detail. The first imaging system 4A includes, for example, a quarter wave plate 31A, a first polarizer 32A and a first camera 33A that is configured as the first imaging unit.

The quarter wave plate 31A is configured to respectively convert the linearly polarized lights (a reference light component and a measurement light component of the first light) transmitted leftward in the Z-axis direction through the second non-polarizing beam splitter 13B, into circularly polarized lights.

The first polarizer 32A is configured to selectively transmit the respective components of the first light converted into the circularly polarized lights by the quarter wave plate 31A. This configuration causes interference of the reference light component and the measurement light component of the first light having different rotating directions, with regard to a specific phase. The "first polarizer 32A" is configured as the "phase shift unit" and the "interfering unit" according to one or more embodiments.

The first polarizer 32A according to one or more embodiments is configured to be rotatable about the Z-axis direction as the axial center and is controlled to change its transmission axis direction by 45 degrees each. More specifically, the transmission axis direction is changed to "0 degree", "45 degrees", "90 degrees" and "135 degrees" relative to the Y-axis direction.

This configuration causes interference of the reference light component and the measurement light component of the first light transmitted through the first polarizer 32A, in four different phases. This accordingly generates interfering lights having phases that are different from one another by 90 degrees. More specifically, this generates an interfering light having a phase of "0 degree", an interfering light having a phase of "90 degrees", an interfering light having a phase of "180 degrees" and an interfering light having a phase of "270 degrees".

Figure 6:
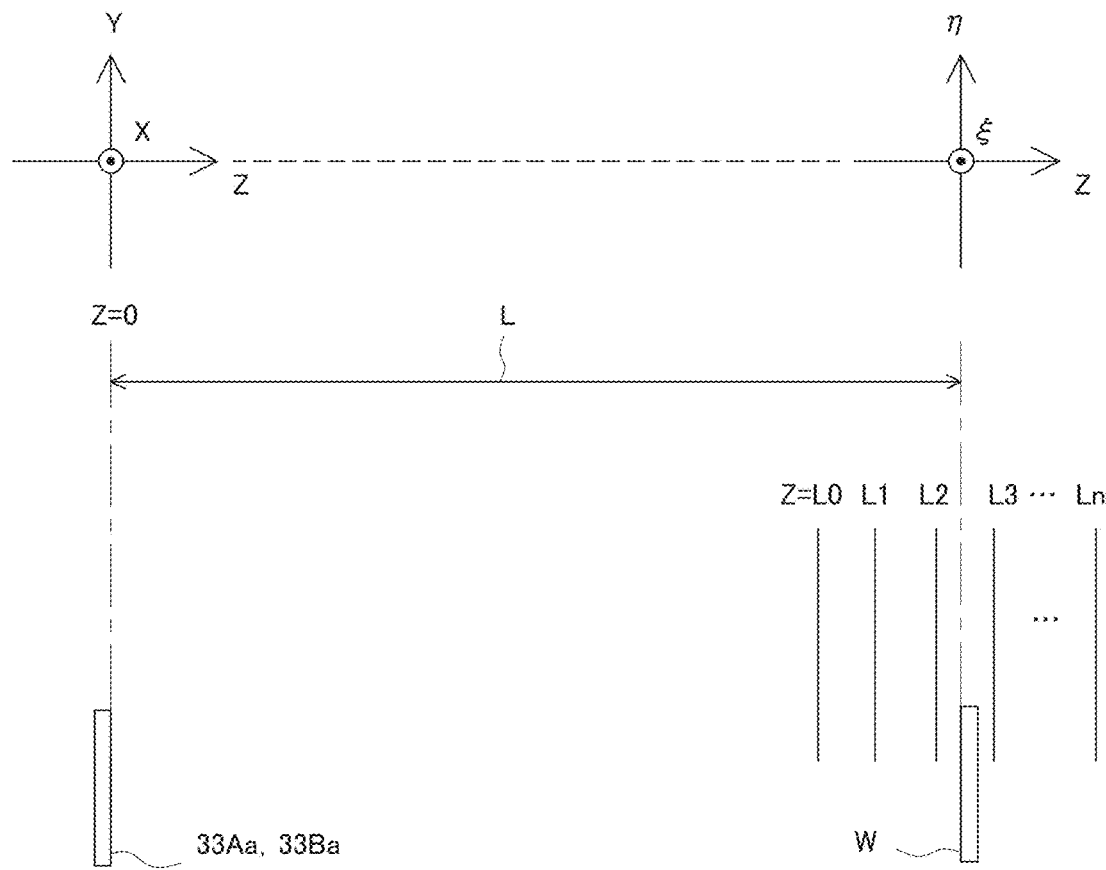
FIG. 6 is an explanatory diagram illustrating a positional relationship between a work and an imaging element and the like, according to one or more embodiments.

The first camera 33A has a known configuration including a lens, an imaging element 33Aa (as shown in FIG. 6) and the like. According to one or more embodiments, a CCD area sensor is employed as the imaging element 33Aa of the first camera 33A. The imaging element 33Aa is, however, not limited to one or more embodiments. For example, a CMOS area sensor or the like may be employed as the imaging element 33Aa. Also a telecentric lens may be used for the lens.

Image data taken by the first camera 33A are converted into digital signals inside of the first camera 33A and are input in the form of digital signals into the control device 5 (image data storage device 54).

More specifically, an interference fringe image having a phase of "0 degree", an interference fringe image having a phase of "90 degrees", an interference fringe image having a phase of "180 degrees" and an interference fringe image having a phase of "270 degrees" with regard to the first light are taken by the first camera 33A.

Like the first imaging system 4A, the second imaging system 4B includes, for example, a quarter wave plate 31B, a second polarizer 32B and a second camera 33B that is configured as the second imaging unit.

The quarter wave plate 31B is configured to respectively convert the linearly polarized lights (a reference light component and a measurement light component of the second light) transmitted upward in the Y-axis direction through the first non-polarizing beam splitter 13A, into circularly polarized lights.

Like the first polarizer 32A, the second polarizer 32B is configured to selectively transmit the respective components of the second light converted into the circularly polarized lights by the quarter wave plate 31B. This configuration causes interference of the reference light component and the measurement light component of the second light having different rotating directions, with regard to a specific phase. The "second polarizer 32B" is configured as the "phase shift unit" and the "interfering unit" according to one or more embodiments.

The second polarizer 32B according to one or more embodiments is configured to be rotatable about the Y-axis direction as the axial center and is controlled to change its transmission axis direction by 45 degrees each. More specifically, the transmission axis direction is changed to "0 degree", "45 degrees", "90 degrees" and "135 degrees" relative to the X-axis direction.

This configuration causes interference of the reference light component and the measurement light component of the second light transmitted through the second polarizer 32B, in four different phases. This accordingly generates interfering lights having phases that are different from one another by 90 degrees. More specifically, this generates an interfering light having a phase of "0 degree", an interfering light having a phase of "90 degrees", an interfering light having a phase of "180 degrees" and an interfering light having a phase of "270 degrees".

Like the first camera 33A, the second camera 33B has a known configuration including a lens, an imaging element 33Ba (as shown in FIG. 6) and the like. According to one or more embodiments, like the first camera 33A, a CCD area sensor is employed as the imaging element 33Ba of the second camera 33B. The imaging element 33Ba is, however, not limited to one or more embodiments. For example, a CMOS area sensor or the like may be employed as the imaging element 33Ba. Also a telecentric lens may be used for the lens.

Like the first camera 33A, image data taken by the second camera 33B are converted into digital signals inside of the second camera 33B and are input in the form of digital signals into the control device 5 (image data storage device 54).

More specifically, an interference fringe image having a phase of "0 degree", an interference fringe image having a phase of "90 degrees", an interference fringe image having a phase of "180 degrees" and an interference fringe image having a phase of "270 degrees" with regard to the second light are taken by the second camera 33B.

The following describes the electrical configuration of the control device 5. As shown in FIG. 2, the control device 5 includes CPU and input/output interfaces 51 configured to control the entire three-dimensional measurement device 1, an input device 52 configured by a keyboard and a mouse or by a touch panel as the "input unit", a display device 53 configured as the "display unit" including a display screen such as a liquid crystal screen, an image data storage device 54 configured to successively store the image data taken by the cameras 33A and 33B and the like, a calculation result storage device 55 configured to store results of various calculations, and a set data storage device 56 configured to store various information in advance. These devices 52 to 56 are electrically connected with the CPU and input/output interfaces 51.

The following describes the functions of the three-dimensional measurement device 1. Radiation of the first light and radiation of the second light are performed simultaneously according to one or more embodiments as described later. The optical path of the first light and the optical path of the second light partly overlap each other. For the better understanding, the optical path of the first light and the optical path of the second light are illustrated in different drawings and are described individually.

Figure 3:
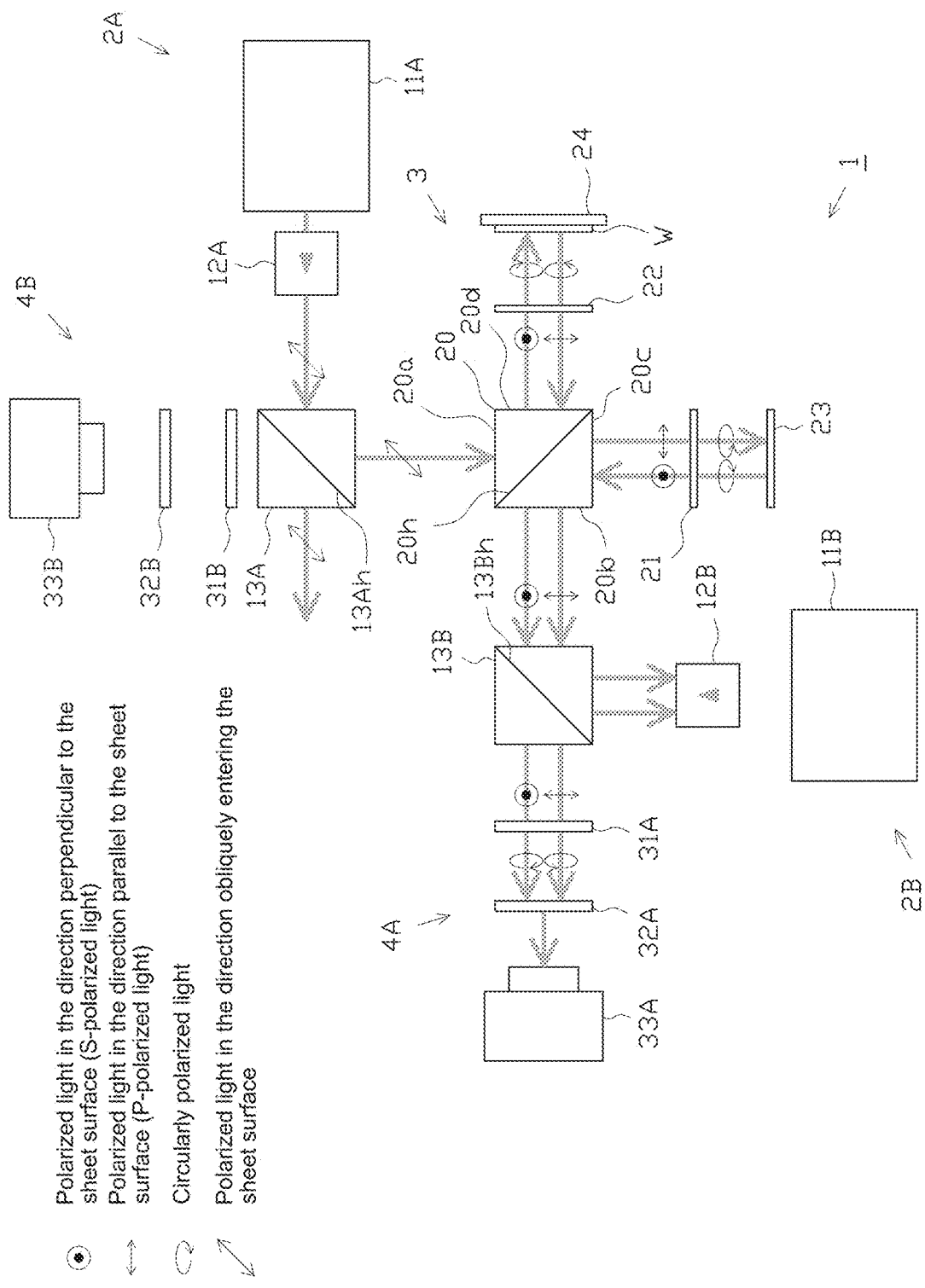
FIG. 3 is an optical path diagram illustrating an optical path of first light according to one or more embodiments.

The optical path of the first light is described first with reference to FIG. 3. As shown in FIG. 3, the first light of the wavelength $\lambda_1$ (linearly polarized light having the polarizing direction inclined at 45 degrees to the X-axis direction and the Y-axis direction) is emitted leftward in the Z-axis direction from the first light emitter 11A.

The first light emitted from the first light emitter 11A passes through the first light isolator 12A and enters the first non-polarizing beam splitter 13A. Part of the first light entering the first non-polarizing beam splitter 13A is transmitted leftward in the Z-axis direction, while the remaining part is reflected downward in the Y-axis direction.

The first light reflected downward in the Y-axis direction (linearly polarized light having the polarizing direction inclined at 45 degrees to the X-axis direction and the Z-axis direction) enters the first surface 20a of the polarizing beam splitter 20. The first light transmitted leftward in the Z-axis direction, on the other hand, does not enter any optical system or the like but is left as waste light.

This waste light may be used for the measurement of wavelength or for the measurement of light power as needed basis. This stabilizes the light source and thereby improves the measurement accuracy.

With regard to the first light entering the first surface 20a of the polarizing beam splitter 20 downward in the Y-axis direction, its P-polarized light component is transmitted downward in the Y-axis direction and is emitted from the third surface 20c as the reference light, while its S-polarized light component is reflected rightward in the Z-axis direction and is emitted from the fourth surface 20d as the measurement light.

The reference light (P-polarized light) of the first light emitted from the third surface 20c of the polarizing beam splitter 20 passes through the quarter wave plate 21 to be converted into clockwise circularly polarized light and is then reflected by the reference surface 23. The rotating direction is maintained relative to the traveling direction of light. The reference light of the first light subsequently passes through the quarter wave plate 21 again to be converted from the clockwise circularly polarized light into the S-polarized light and then reenters the third surface 20c of the polarizing beam splitter 20.

The measurement light (S-polarized light) of the first light emitted from the fourth surface 20d of the polarizing beam splitter 20, on the other hand, passes through the quarter wave plate 22 to be converted into counterclockwise circularly polarized light and is then reflected by the work W. The rotating direction is maintained relative to the traveling direction of light. The measurement light of the first light subsequently passes through the quarter wave plate 22 again to be converted from the counterclockwise circularly polarized light into the P-polarized light and then reenters the fourth surface 20d of the polarizing beam splitter 20.

The reference light (S-polarized light) of the first light reentering the third surface 20c of the polarizing beam splitter 20 is reflected leftward in the Z-axis direction by the joint surface 20h, while the measurement light (P-polarized light) of the first light reentering the fourth surface 20d is transmitted leftward in the Z-axis direction through the joint surface 20h. The combined light generated by recombining the reference light and the measurement light of the first light with each other is then emitted as the output light from the second surface 20b of the polarizing beam splitter 20.

The combined light (reference light and measurement light) of the first light emitted from the second surface 20b of the polarizing beam splitter 20 enters the second non-polarizing beam splitter 13B. Part of the combined light of the first light entering the second non-polarizing beam splitter 13B leftward in the Z-axis direction is transmitted leftward in the Z-axis direction, while the remaining part is reflected downward in the Y-axis direction. The combined light (reference light and measurement light) transmitted leftward in the Z-axis direction enters the first imaging system 4A. The combined light reflected downward in the Y-axis direction is, on the other hand, blocked by the second light isolator 12B to be left as waste light.

With regard to the combined light (reference light and measurement light) of the first light entering the first imaging system 4A, the quarter wave plate 31A converts its reference light component (S-polarized light component) into counterclockwise circularly polarized light, while converting its measurement light component (P-polarized light component) into clockwise circularly polarized light. The counterclockwise circularly polarized light and the clockwise circularly polarized light have different rotating directions and accordingly do not interfere with each other.

The combined light of the first light subsequently passes through the first polarizer 32A, so that its reference light component and its measurement light component interfere with each other in a phase corresponding to the angle of the first polarizer 32A. An image of this interfering light of the first light is then taken by the first camera 33A.

Figure 4:
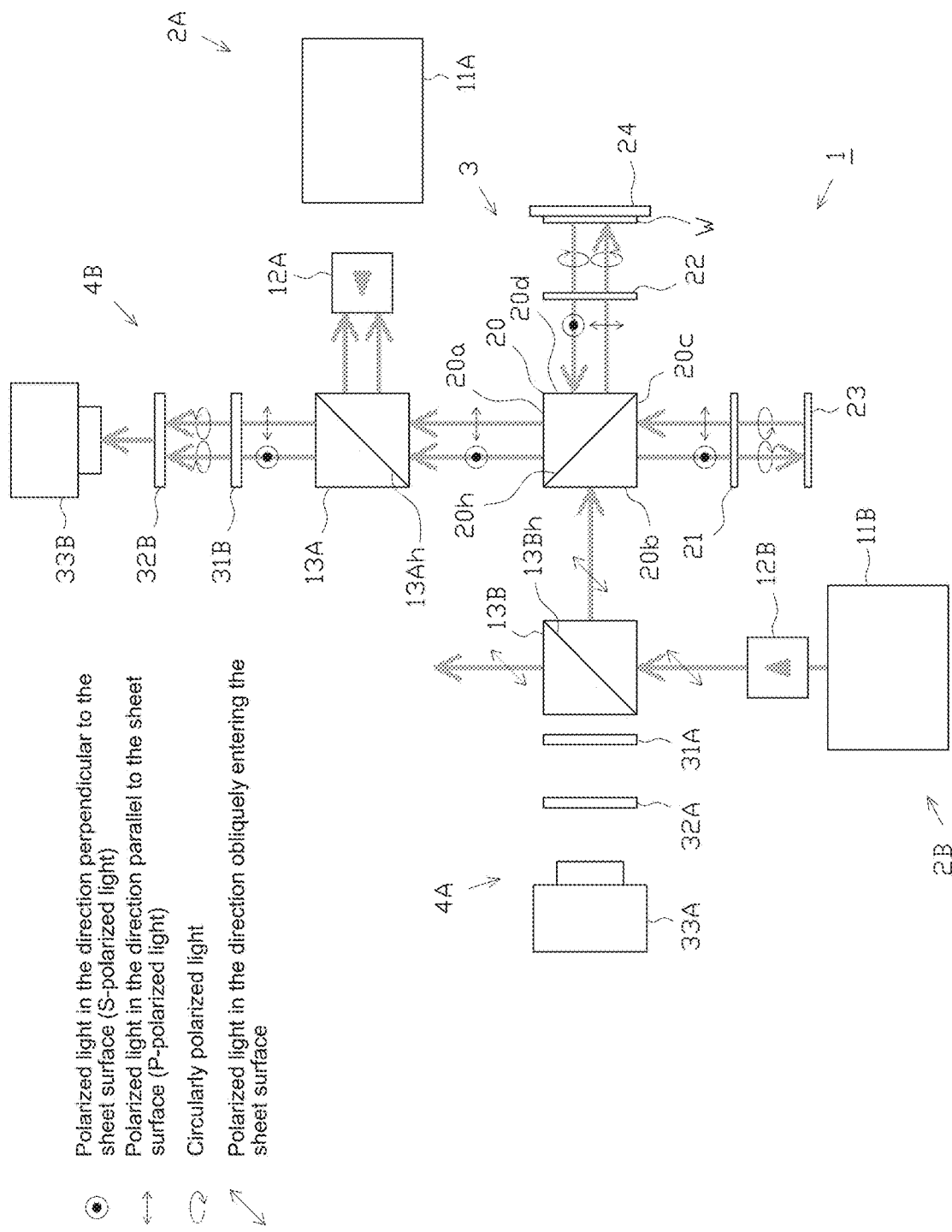
FIG. 4 is an optical path diagram illustrating an optical path of second light according to one or more embodiments.

The following describes the optical path of the second light with reference to FIG. 4. As shown in FIG. 4, the second light of the wavelength $\lambda_2$ (linearly polarized light having the polarizing direction inclined at 45 degrees to the X-axis direction and the Z-axis direction) is emitted upward in the Y-axis direction from the second light emitter 11B.

The second light emitted from the second light emitter 11B passes through the second light isolator 12B and enters the second non-polarizing beam splitter 13B. Part of the second light entering the second non-polarizing beam splitter 13B is transmitted upward in the Y-axis direction, while the remaining part is reflected rightward in the Z-axis direction.

The second light reflected rightward in the Z-axis direction (linearly polarized light having the polarizing direction inclined at 45 degrees relative to the X-axis direction and the Y-axis direction) enters the second surface 20b of the polarizing beam splitter 20. The second light transmitted upward in the Y-axis direction, on the other hand, does not enter any optical system or the like but is left as waste light.

This waste light may be used for the measurement of wavelength or for the measurement of light power as needed basis. This stabilizes the light source and thereby improves the measurement accuracy.

With regard to the second light entering the second surface 20b of the polarizing beam splitter 20 rightward in the Z-axis direction, its S-polarized light component is reflected downward in the Y-axis direction and is emitted from the third surface 20c as the reference light, while its P-polarized light component is transmitted rightward in the Z-axis direction and is emitted from the fourth surface 20d as the measurement light.

The reference light (S-polarized light) of the second light emitted from the third surface 20c of the polarizing beam splitter 20 passes through the quarter wave plate 21 to be converted into counterclockwise circularly polarized light and is then reflected by the reference surface 23. The rotating direction is maintained relative to the traveling direction of light. The reference light of the second light subsequently passes through the quarter wave plate 21 again to be converted from the counterclockwise circularly polarized light into the P-polarized light and then reenters the third surface 20c of the polarizing beam splitter 20.

The measurement light (P-polarized light) of the second light emitted from the fourth surface 20d of the polarizing beam splitter 20, on the other hand, passes through the quarter wave plate 22 to be converted into clockwise circularly polarized light and is then reflected by the work W. The rotating direction is maintained relative to the traveling direction of light. The measurement light of the second light subsequently passes through the quarter wave plate 22 again to be converted from the clockwise circularly polarized light into the S-polarized light and then reenters the fourth surface 20d of the polarizing beam splitter 20.

The reference light (P-polarized light) of the second light reentering the third surface 20c of the polarizing beam splitter 20 is transmitted upward in the Y-axis direction through the joint surface 20h, while the measurement light (S-polarized light) of the second light reentering the fourth surface 20d is reflected upward in the Y-axis direction by the joint surface 20h. The combined light generated by recombining the reference light and the measurement light of the second light with each other is then emitted as the output light from the first surface 20a of the polarizing beam splitter 20.

The combined light (reference light and measurement light) of the second light emitted from the first surface 20a of the polarizing beam splitter 20 enters the first non-polarizing beam splitter 13A. Part of the combined light of the second light entering the first non-polarizing beam splitter 13A upward in the Y-axis direction is transmitted upward in the Y-axis direction, while the remaining part is reflected rightward in the Z-axis direction. The combined light (reference light and measurement light) transmitted upward in the Y-axis direction enters the second imaging system 4B. The combined light reflected rightward in the Z-axis direction is, on the other hand, blocked by the first light isolator 12A to be left as waste light.

With regard to the combined light (reference light and measurement light) of the second light entering the second imaging system 4B, the quarter wave plate 31B converts its reference light component (P-polarized light component) into clockwise circularly polarized light, while converting its measurement light component (S-polarized light component) into counterclockwise circularly polarized light. The counterclockwise circularly polarized light and the clockwise circularly polarized light have different rotating directions and accordingly do not interfere with each other.

The combined light of the second light subsequently passes through the second polarizer 32B, so that its reference light component and its measurement light component interfere with each other in a phase corresponding to the angle of the second polarizer 32B. An image of this interfering light of the second light is then taken by the second camera 33B.

Figure 5:
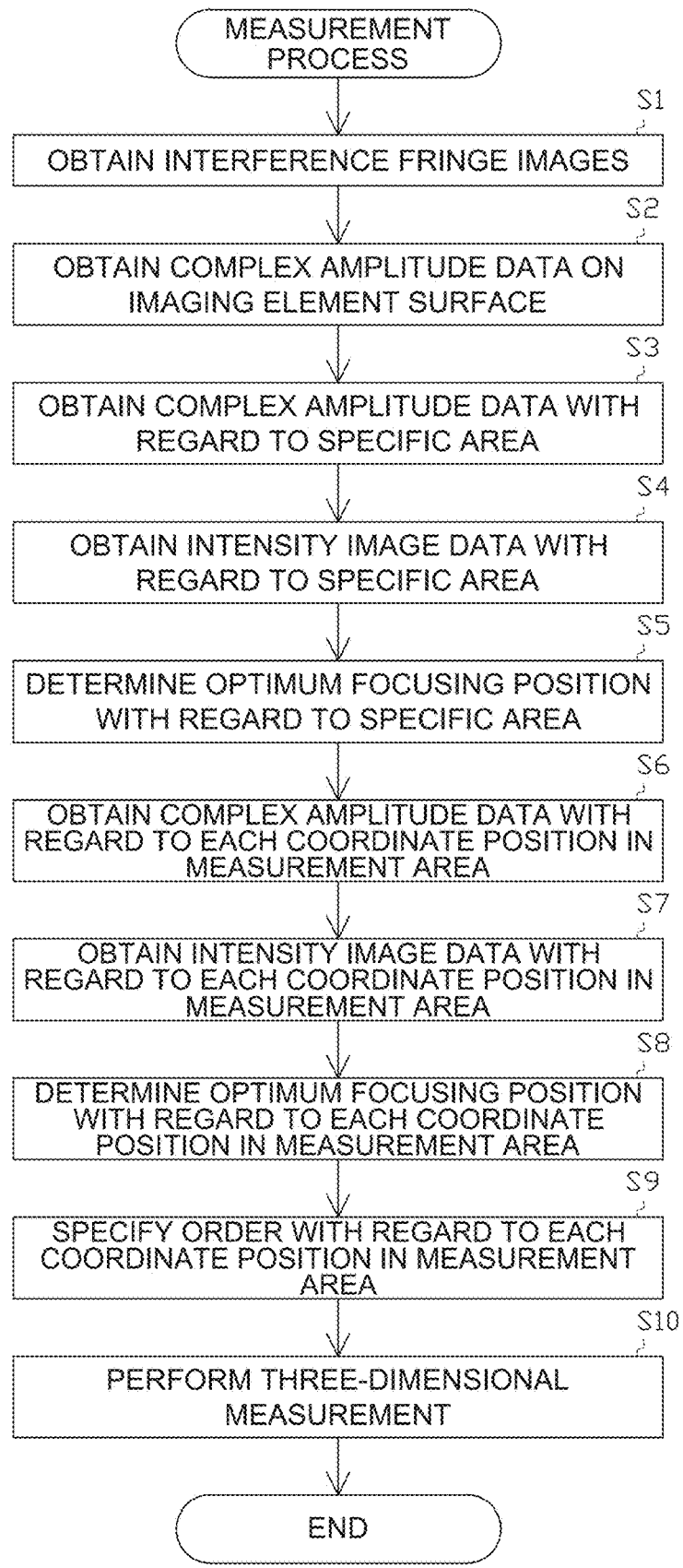
FIG. 5 is a flowchart showing a flow of a measurement process according to one or more embodiments.

The following describes a procedure of measurement process performed by the control device 5 in detail with reference to the flowchart of FIG. 5 and other drawings. In the description of this measurement process below, an imaging element 33Aa-surface of the first camera 33A or an imaging element 33Ba-surface of the second camera 33B is defined as an x-y plane, and an optical axis direction perpendicular to this x-y plane is defined as a z direction. As a matter of course, this coordinate system (x, y, z) is a coordinate system different from the coordinate system (X, Y, Z) used to describe the entire three-dimensional measurement device 1.

At step S1, the control device 5 first performs a process of obtaining interference fringe images with regard to a predetermined measurement area of the work W (the entire area or a partial area of the work W). According to one or more embodiments, the control device 5 obtains four different interference fringe images having different phases with regard to the first light and four different interference fringe images having different phases with regard to the second light. This is described more in detail below.

After the work W is placed on the placement structure 24, the control device 5 sets the transmission axis direction of the first polarizer 32A of the first imaging system 4A at a predetermined reference position (for example, "0 degree"), while setting the transmission axis direction of the second polarizer 32B of the second imaging system 4B at a predetermined reference position (for example, "0 degree").

The control device 5 subsequently causes the first light to be radiated from the first projection optical system 2A and simultaneously causes the second light to be radiated from the second projection optical system 2B. As a result, the combined light (reference light and measurement light) of the first light is emitted from the second surface 20b of the polarizing beam splitter 20 of the interference optical system 3, and simultaneously the combined light (reference light and measurement light) of the second light is emitted from the first surface 20a of the polarizing beam splitter 20.

An image of the combined light of the first light emitted from the second surface 20b of the polarizing beam splitter 20 is taken by the first imaging system 4A, and simultaneously an image of the combined light of the second light emitted from the first surface 20a of the polarizing beam splitter 20 is taken by the second imaging system 4B.

The transmission axis direction of the first polarizer 32A and the transmission axis direction of the second polarizer 32B are both set to "0 degree", so that an interference fringe image of the first light in a phase of "0 degree" is taken by the first camera 33A, and an interference fringe image of the second light in a phase of "0 degree" is taken by the second camera 33B.

The respectively taken image data are then output from the respective cameras 33A and 33B to the control device 5. The control device 5 stores the input image data into the image data storage device 54.

The control device 5 subsequently performs a changeover process of the first polarizer 32A of the first imaging system 4A and the second polarizer 32B of the second imaging system 4B. More specifically, the first polarizer 32A and the second polarizer 32B are respectively rotated and shifted to positions having their transmission axis directions set at "45 degrees".

On completion of the changeover process, the control device 5 performs a second imaging process in a similar manner to the series of first imaging process described above. More specifically, the control device 5 causes the first light to be radiated from the first projection optical system 2A and simultaneously causes the second light to be radiated from the second projection optical system 2B. The control device 5 subsequently causes an image of the combined light of the first light emitted from the second surface 20b of the polarizing beam splitter 20 to be taken by the first imaging system 4A and simultaneously causes an image of the combined light of the second light emitted from the first surface 20a of the polarizing beam splitter 20 to be taken by the second imaging system 4B. The control device 5 accordingly obtains an interference fringe image of the first light in a phase of "90 degree" and an interference fringe image of the second light in a phase of "90 degree".

After that, two more imaging processes similar to the first imaging process and the second imaging process described above are performed. More specifically, a third imaging process is performed with setting the transmission axis directions of the first polarizer 32A and the second polarizer 32B at "90 degrees", so as to obtain an interference fringe image of the first light in a phase of "180 degree" and an interference fringe image of the second light in a phase of "180 degree".

A fourth imaging process is then performed with setting the transmission axis directions of the first polarizer 32A and the second polarizer 32B at "135 degrees", so as to obtain an interference fringe image of the first light in a phase of "270 degree" and an interference fringe image of the second light in a phase of "270 degree".

All image data required for measurement of the predetermined measurement area of the work W (total of eight different interference fringe images including four different interference fringe images with regard to the first light and four different interference fringe images with regard to the second light) are obtained by performing the four imaging processes as described above.

At subsequent step S2, the control device 5 performs a process of obtaining complex amplitude data of light on the imaging element 33Aa-surface or on the imaging element 33Ba-surface.

According to one or more embodiments, the control device 5 obtains complex amplitude data Eo(x,y) of light on the imaging element 33Aa-surface or on the imaging element 33Ba-surface with regard to the first light and the second light, based on the four different interference fringe images with regard to the first light and the four different interference fringe images with regard to the second light stored in the image data storage device 54.

Interference fringe intensities of the four different interference fringe images with regard to the first light or with regard to the second light at an identical coordinate position (x,y), i.e., luminance values $I_1(x,y)$, $I_2(x,y)$, $I_3(x,y)$ and $I_4(x,y)$, may be expressed by relational expressions of [Math. 1] given below:

$$I_1(x,y)=B(x,y)+A(x,y)\cos[\Delta\phi(x,y)]$$
$$I_2(x,y)=B(x,y)+A(x,y)\cos[\Delta\phi(x,y)+90°]$$
$$I_3(x,y)=B(x,y)+A(x,y)\cos[\Delta\phi(x,y)+180°]$$
$$I_4(x,y)=B(x,y)+A(x,y)\cos[\Delta\phi(x,y)+270°] \quad \text{[Math. 1]}$$

$\Delta\phi(x,y)$ denotes a phase difference based on the optical path difference between the measurement light and the reference light at the coordinates (x,y). A(x,y) denotes an amplitude of the interfering light, and B(x,y) denotes a bias. The reference light is, however, uniform. From this viewpoint as the basis, $\Delta\phi(x,y)$ denotes a "phase of the measurement light", and A(x,y) denotes an "amplitude of the measurement light".

Accordingly, the phase $\Delta\phi(x,y)$ of the measurement light that reaches the imaging element 33Aa-surface or the imaging element 33Ba-surface may be determined by a relational expression of [Math. 2] given below, based on the relational expressions of [Math. 1] given above:

$$\Delta\phi(x,y) = \arctan\frac{I_4(x,y)-I_2(x,y)}{I_1(x,y)-I_3(x,y)} \quad \text{[Math. 2]}$$

The amplitude A(x,y) of the measurement light that reaches the imaging element 33Aa-surface or the imaging element 33Ba-surface may be determined by a relational expression of [Math. 3] given below, based on the relational expressions of [Math. 1] given above:

$$A(x,y)=\tfrac{1}{2}\times\sqrt{\{I_1(x,y)-I_3(x,y)\}^2+\{I_4(x,y)-I_2(x,y)\}^2} \quad \text{[Math. 3]}$$

Complex amplitude data Eo(x,y) on the imaging element 33Aa-surface or on the imaging element 33Ba-surface may subsequently be calculated from the phase $\Delta\phi(x,y)$ and the amplitude A(x,y) described above according to a relational expression of [Math. 4] given below, where i denotes an imaginary unit:

$$E_0(x,y)=A(x,y)e^{i\phi(x,y)} \quad \text{[Math. 4]}$$

At subsequent step S3, the control device 5 performs a process of obtaining complex amplitude data at multiple positions in the z direction with regard to a specific area V (shown in FIG. 7) that is a preset part in the measurement area on the work W.

According to one or more embodiments, the control device 5 obtains complex amplitude data with regard to the specific area V at every predetermined measurement range interval in a predetermined range Q1 in the z direction (first range in the optical axis direction) where the work W is likely to be present, on the basis of a device origin that is a basis of height measurement in the three-dimensional measurement device 1.

The "specific area V" herein is an area that is set arbitrarily with a view to grasping in advance the position of the work W in the z direction. For example, when the work W is a wafer substrate 100 as shown in FIGS. 8 and 9, a pattern portion 102 that is likely to be a reference surface of height measurement of a bump 101 is set as the specific area V.

Figure 8:
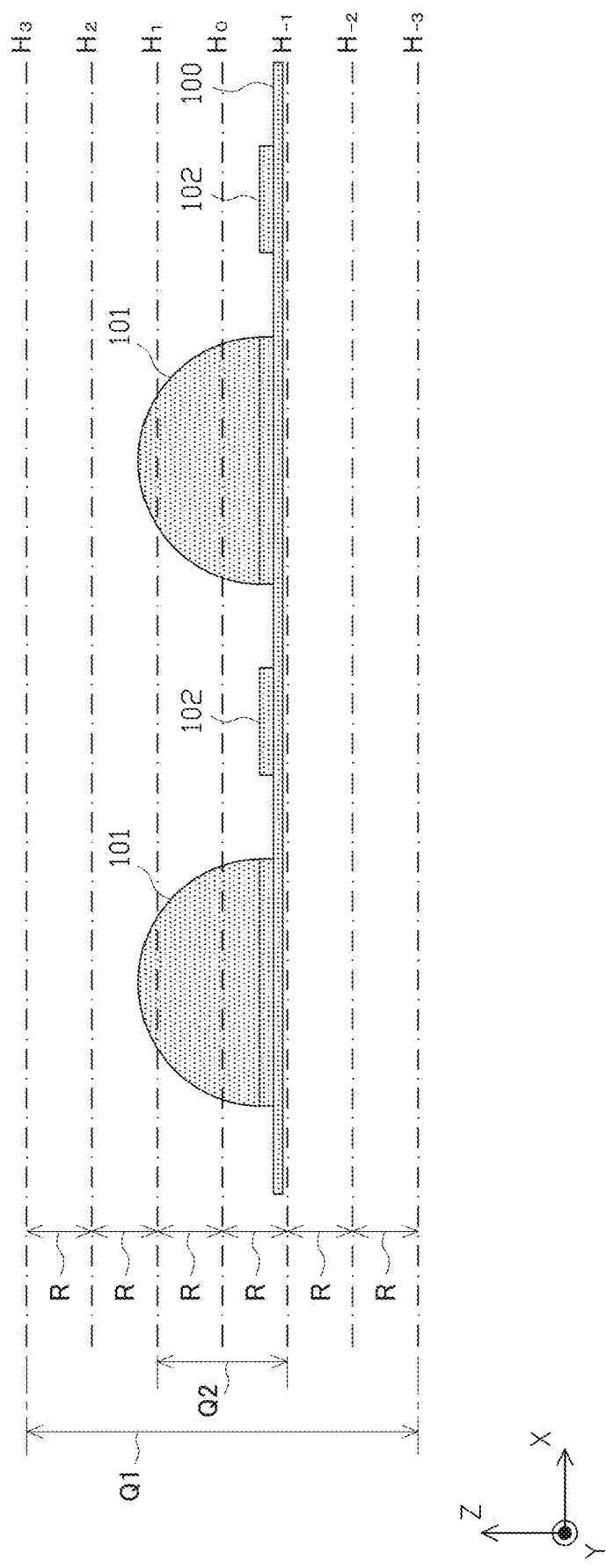
FIG. 8 is a schematic diagram illustrating three-dimensional measurement of a wafer substrate according to one or more embodiments.
Figure 9:
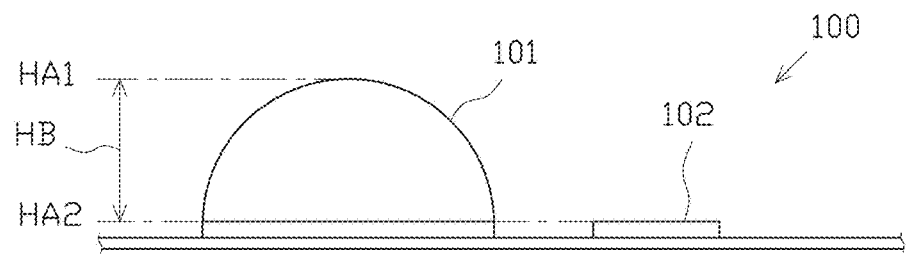
FIG. 9 is a schematic diagram illustrating three-dimensional measurement of a bump according to one or more embodiments.

In an example of measurement of the wafer substrate 100 shown in FIG. 8, the specific area V is set, such that complex amplitude data are obtained at respective height positions $H_3$, $H_2$, $H_1$, $H_0$, $H_{-1}$, $H_{-2}$ and $H_{-3}$ that are respectively set at measurement range intervals R in the top-bottom direction around a device origin $H_0$ that is the basis of height measurement in the three-dimensional measurement device 1.

The following describes a procedure of obtaining the complex amplitude data at step S3 in detail. A method of obtaining unknown complex amplitude data at a different position in the z direction from known complex amplitude data at a predetermined position in the z direction is described first.

Two coordinate systems (an x-y coordinate system and a ξ-η coordinate system) that are away from each other by a distance d in the z direction are assumed herein. A relationship shown by [Math. 5] given below is obtained, when the x-y coordinate system is expressed as z=0, known complex amplitude data of light in the x-y coordinate system is expressed as Eo(x,y), and unknown complex amplitude data of light on a ξ-η plane that is away from an x-y plane by the distance d is expressed as Eo(ξ,η), where λ denotes a wavelength:

$$E_0(x, y) = \quad [\text{Math. 5}]$$

$$\frac{i}{\lambda} \int_{-\infty}^{\infty} \int_{-\infty}^{\infty} E_0(\xi, \eta) \frac{\exp\left(-i \frac{2\pi}{\lambda} \sqrt{d^2 + (\xi - x)^2 + (\eta - y)^2}\right)}{\sqrt{d^2 + (\xi - x)^2 + (\eta - y)^2}}$$

$$d\xi d\eta = \mathcal{F}^{-1}\{\mathcal{F}(E_0(\xi, \eta)) \cdot \mathcal{F}(g(\xi, \eta, x, y))\}$$

$$g(\xi, \eta, x, y) = \frac{i}{\lambda} \frac{\exp\left(-i \frac{2\pi}{\lambda} \sqrt{d^2 + (\xi - x)^2 + (\eta - y)^2}\right)}{\sqrt{d^2 + (\xi - x)^2 + (\eta - y)^2}}$$

$\mathcal{F}$ : Fourier Transform
$\mathcal{F}^{-1}$: Inverse Fourier Transform

[Math. 6] given below is obtained by solving this expression with respect to Eo(ξ,η):

$$E_0(\xi, \eta) = \mathcal{F}^{-1}\left\{\frac{\mathcal{F}(E_0(x, y))}{\mathcal{F}(g(\xi, \eta, x, y))}\right\} \quad [\text{Math. 6}]$$

Figure 7:
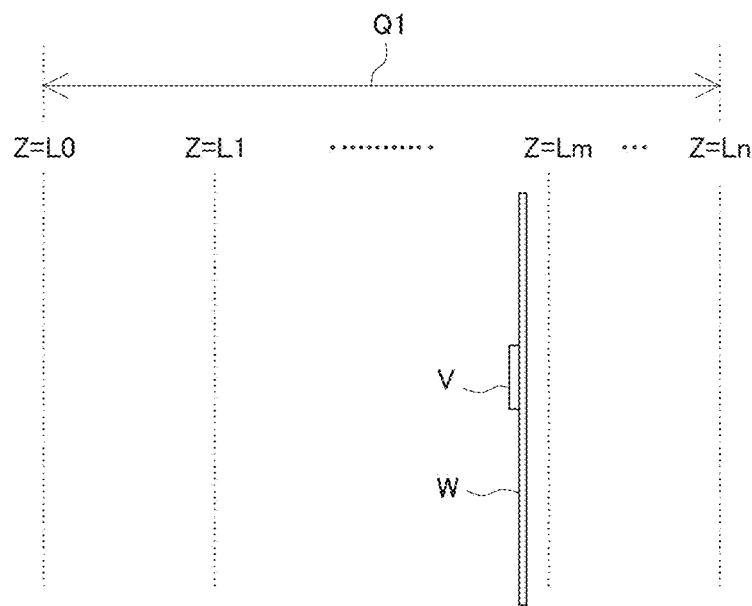
FIG. 7 is an explanatory diagram illustrating the positional relationship between the work and the imaging element and the like, according to one or more embodiments.

Accordingly, at step S3, the control device 5 obtains complex amplitude data EoL0(ξ,η), EoL1(ξ,η), ..., EoLn (ξ,η) at respective positions (z=L0, L1, ..., Ln) that are away in the z direction from the imaging element 33Aa-surface or the imaging element 33Ba-surface by a distance L=L0, L1, L2, ..., Ln, based on the complex amplitude data Eo(x,y) on the imaging element 33Aa-surface or the imaging element 33Ba-surface obtained at step S2, as shown in FIGS. 6 and 7.

At subsequent step S4, the control device 5 performs a process of obtaining intensity image (luminance image) data at multiple positions in the z direction with regard to the specific area V.

More specifically, the control device 5 obtains intensity image data respectively from the complex amplitude data EoL0(ξ,η), EoL1(ξ,η), ..., EoLn(ξ,η) at the multiple positions in the z direction with regard to the specific area V obtained at step S3 described above. Accordingly, the function of performing the series of reconstruction process of steps S2 to S4 described above is configured as the first image data obtaining unit according to one or more embodiments.

When the complex amplitude data in the ξ-η plane is expressed as Eo(ξ,η), intensity image data I(ξ,η) in the ξ-η plane may be determined by a relational expression of [Math. 7] given below:

$$I=(\xi,\eta)=|E_0(\xi,\eta)|^2 \quad [\text{Math. 7}]$$

At subsequent step S5, the control device 5 performs a process of determining an optimum focusing position (focusing position in the optical axis direction) with regard to the specific area V. The function of performing the process of step S5 is configured as the first focusing position determining unit according to one or more embodiments.

More specifically, the control device 5 determines the optimum focusing position in the z direction of the specific area V, based on the intensity image data at the multiple positions in the z direction with regard to the specific area V obtained at step S4 described above. The following describes a method of determining the optimum focusing position of the specific area V from the contrast values of the intensity image data.

The method first determines the contrast values of luminance between a "specific coordinate position" and "other coordinate positions" with regard to the intensity image data of the specific area V at the respective positions in the z direction (z=L0, L1, ..., Ln) that are away in the z direction from the imaging element 33Aa-surface or the imaging element 33Ba-surface by the distance L=L0, L1, L2, ..., Ln. The method subsequently extracts a position (z=Lm) where the intensity image data having the highest contrast value is obtained among these contrast values, as the optimum focusing position.

The method of determining the optimum focusing position of the specific area V is not limited to the method of determination from the contrast values of the intensity image data described above, but another method may be employed. For example, a method of determination from the luminance values of the intensity image data may be employed.

This method takes advantage of the characteristic that the intensity image data has the highest intensity on a plane where an object is actually present. More specifically, the method calculates average luminance values at respective coordinate positions in the specific area V from the intensity image data of the specific area V at the respective positions in the z direction (z=L0, L1, ..., Ln). The method subsequently extracts a position (z=Lm) where the intensity image data having the highest average luminance value is obtained among these average luminance values, as the optimum focusing position.

In a measurement example of the wafer substrate 100 shown in FIG. 8, the contrast values or the average luminance values are determined with regard to the intensity image data of a pattern portion 102 at height positions $H_3$, $H_2$, $H_1$, $H_0$, $H_{-1}$, $H_{-2}$ and $H_{-3}$. A position (for example, a height position $H_{-1}$) where the intensity image data having the highest contrast value or the highest average luminance value is obtained among the contrast values or the average luminance values is extracted as the optimum focusing position.

At subsequent step S6, the control device 5 performs a process of obtaining complex amplitude data at multiple positions in the z direction with regard to respective coordinate positions in the entire predetermined measurement area of the work W.

According to one or more embodiments, the control device 5 obtains complex amplitude data with regard to the respective coordinate positions in the measurement area at predetermined measurement range intervals in a predetermined range Q2 in the z direction (a second range in the optical axis direction) where a predetermined measurement object on the work W is likely to be present (for example, a bump 101 on the wafer substrate 100), on the basis of the optimum focusing position of the specific area V determined at step S5 described above.

For example, in the measurement example of the wafer substrate 100 shown in FIG. 8, the procedure is set to obtain complex amplitude data at the height positions $H_1$, $H_0$ and $H_{-1}$ that are set at measurement range intervals R upward from the optimum focusing position (height position $H_{-1}$) of the specific area V as the basis.

In the example shown in FIG. 8, the predetermined range Q2 in the z direction is set to be narrower than the predetermined range Q1 in the z direction. This configuration is, however, not restrictive. According to a modified configuration, the predetermined range Q2 in the z direction may be set to be equal to the predetermined range Q1 in the z direction or may be set to be wider than the predetermined range Q1 in the z direction. However, the predetermined range Q2 in the z direction may be set narrower than the predetermined range Q1 in the z direction with a view to reducing the load of the process of obtaining data required for three-dimensional measurement with regard to the respective coordinate positions in the entire measurement area and shortening the time period required for this process.

The method of obtaining the complex amplitude data at step S6 is similar to the method of obtaining the complex amplitude data at step S3 described above and is thereby not described in detail.

At subsequent step S7, the control device 5 performs a process of obtaining intensity image data at multiple positions in the z direction with regard to the respective coordinate positions in the measurement area on the work W. Accordingly, the function of performing the series of processing of steps S6 and S7 described above is configured as the second image data obtaining unit according to one or more embodiments.

More specifically, the control device 5 obtains intensity image data at the multiple positions in the z direction with regard to the respective coordinate positions in the measurement area on the work W, based on the complex amplitude data obtained at step S6 described above. The method of obtaining the intensity image data from the complex amplitude data at step S7 is similar to the method of obtaining the intensity image data at step S4 described above and is thereby not described in detail.

At subsequent step S8, the control device 5 performs a process of determining an optimum focusing position (focusing position in the optical axis direction) with regard to each coordinate position in the measurement area on the work W. The function of performing the processing of this step S8 is configured as the second focusing position determining unit according to one or more embodiments.

More specifically, the control device 5 determines the optimum focusing position in the z direction at each coordinate position in the measurement area, based on the intensity image data at the multiple positions in the z direction with regard to the respective coordinate positions in the measurement area obtained at step S7 described above. The method of determining the optimum focusing position from the intensity image data at the multiple positions in the z direction at step S8 is similar to the method of determining the optimum focusing position at step S5 described above and is thereby not described in detail.

At subsequent step S9, the control device 5 performs a process of specifying an order corresponding to the optimum focusing position with regard to each coordinate position in the measurement area on the work W determined at step S8, as an order of a measurement range with regard to each coordinate position. The function of performing the processing of this step S9 is configured as the order specifying unit according to one or more embodiments.

The following describes a method of specifying the order of the measurement range with reference to a concrete example shown in FIG. 11. In the example shown in FIG. 11, the wafer substrate 100 shown in FIG. 8 is subjected to height measurement in a range of "−3500 (nm)" to "3500 (nm)" by using light having a measurement range (corresponding to one period [−180 degrees to 180 degrees] of sine wave in the phase shift method) of 1000 nm (combined wavelength light of two different wavelengths according to one or more embodiments).

In "Case 1" shown in FIG. 11, among intensity image data reconstructed at height positions $H_3$, $H_2$, $H_1$, $H_0$, $H_{-1}$, $H_{-2}$ and $H_{-3}$ with regard to a predetermined coordinate position (reconstructed images [1] to [7]), the intensity image data reconstructed at the height position $H_2$ (reconstructed image [2]) has a maximum luminance value of "250". Accordingly, with regard to this predetermined coordinate position, the height position $H_2$ is determined as the optimum focusing position, and an order [2] corresponding to this optimum focusing position is specified as the order of the measurement range with regard to this predetermined coordinate position.

In "Case 2" shown in FIG. 11, among intensity image data reconstructed at the height positions $H_3$, $H_2$, $H_1$, $H_0$, $H_{-1}$, $H_{-2}$ and $H_{-3}$ with regard to the predetermined coordinate position (reconstructed images [1] to [7]), the intensity image data reconstructed at the height position $H_2$ (reconstructed image [2]) and the intensity image data reconstructed at the height position $H_1$ (reconstructed image [3]) have a maximum luminance value of "128".

In this case, the actual height with regard to this predetermined coordinate position is expected to be a height corresponding to the vicinity of a boundary between the measurement range of an order [2] and the measurement range of an order [1]. Accordingly, at this time, two orders [2] and [1] are specified as the order of the measurement range with regard to this predetermined coordinate position.

At subsequent step S10, the control device 5 performs a three-dimensional measurement process. The function of performing the processing of this step S10 is configured as the three-dimensional measurement unit according to one or more embodiments.

More specifically, the control device 5 first calculates a phase $\phi(\xi,\eta)$ of the measurement light and an amplitude $A(\xi,\eta)$ of the measurement light from the complex amplitude data $Eo(\xi,\eta)$ of the optimum focusing position at each coordinate position in the measurement area determined at step S8, according to a relational expression of [Math. 8] given below:

$$E_0(\xi,\eta)=A(\xi,\eta)e^{i\phi(\xi,\eta)} \qquad \text{[Math. 8]}$$

The phase $\phi(\xi,\eta)$ of the measurement light may be determined according to a relational expression of [Math. 9] given below. The function of performing the series of reconstruction process to calculate the phase $\phi(\xi,\eta)$ that is phase information of the measurement light is configured as the phase information obtaining unit according to one or more embodiments:

$$\phi(\xi,\eta) = \arctan\frac{Im[E_0(\xi,\eta)]}{Re[E_0(\xi,\eta)]} \quad [\text{Math. 9}]$$

The amplitude $A(\xi,\eta)$ of the measurement light may be determined according to a relational expression of [Math. 10] given below:
[Math. 10]

$$A(\xi,\eta)=\sqrt{(Re[E_0(\xi,\eta)])^2+(Im[E_0(\xi,\eta)])^2} \quad [\text{Math. 10}]$$

The control device 5 subsequently performs a phase-height conversion process to calculate height information $z(\xi,\eta)$ in the measurement range, which indicates a concavo-convex shape on the surface of the work W in a three-dimensional manner.

The height information $z(\xi,\eta)$ in the measurement range may be calculated according to a relational expression of [Math. 11] given below:

$$Z(\xi,\eta) = \frac{1}{2}\phi(\xi,\eta)\frac{\lambda}{2\pi} \quad [\text{Math. 11}]$$

The control device 5 subsequently obtains real height data (actual height) with regard to the predetermined coordinate position, based on the height information $z(\xi,\eta)$ in the measurement range calculated as described above and the order of the measurement range with regard to each coordinate position specified at step S9.

In the example shown in FIG. 11, when the height information $z(\xi,\eta)$ in the measurement range calculated as described above corresponds to, for example, a phase of "+90 degrees" with regard to a predetermined coordinate position, candidates of real height data with regard to the predetermined coordinate position are [3250 (nm)] of the order [3], [2250 (nm)] of the order [2], [1250 (nm)] of the order [1], [250 (nm)] of the order [0], [−750 (nm)] of the order [−1], [−1750 (nm)] of the order [−2] and [−2750 (nm)] of the order [−3].

For example, when the height position $H_2$ is determined as the optimum focusing position with regard to the predetermined coordinate position and the order [2] corresponding to this optimum focusing position is specified as the order of the measurement range with regard to the predetermined coordinate position as in the "Case 1", the real height data with regard to the predetermined coordinate position can be specified as [2250 (nm)] corresponding to the phase [90 degrees] of the order [2].

In the example shown in FIG. 11, when the height information $z(\xi,\eta)$ in the measurement range calculated as described above corresponds to, for example, a phase of "−180 degrees" with regard to a predetermined coordinate position, candidates of real height data with regard to the predetermined coordinate position are [2500 (nm)] of the order [3], [1500 (nm)] of the order [2], [500 (nm)] of the order [1], [−500 (nm)] of the order [0], [−1500 (nm)] of the order [4], [−2500 (nm)] of the order [−2] and [−3500 (nm)] of the order [−3].

For example, when the height position $H_2$ and the height position $H_1$ are determined as the optimum focusing positions with regard to the predetermined coordinate position and the order [2] and the order [1] corresponding to these optimum focusing positions are specified as the orders of the measurement range with regard to the predetermined coordinate position as in the "Case 2", the real height data with regard to the predetermined coordinate position can be specified as [1500 (nm)] corresponding to the phase [−180 degrees] of the order [2].

When the work W is the wafer substrate 100 (shown in FIG. 9) and the bump 101 is specified as a measurement object, a height HB of the bump 101 relative to a pattern portion 102 that is a measurement reference plane can be determined by subtracting an absolute height HA2 of the pattern portion 102 in the surrounding of the bump 101 from an absolute height HA1 of the bump 101 (HB=HA1−HA2).

For example, an absolute height at any one point on the pattern portion 102 or an average value of absolute heights in a predetermined range on the pattern portion 102 may be used as the absolute height HA2 of the pattern portion 102. The "absolute height HA1 of the bump 101" and the "absolute height HA2 of the pattern portion 102" may be determined from the height information $z(\xi,\eta)$ and the order of the measurement range.

The measurement results of the work W determined as described above are stored into the calculation result storage device 55 of the control device 5.

Measurement using two different lights having different wavelengths (wavelengths $\lambda_1$ and $\lambda_2$) is equivalent to measurement using a light of a combined wavelength $\lambda_0$. Its measurement range is expanded to $\lambda_0/2$. The combined wavelength $\lambda_0$ is expressed by Expression (M1) given below:

$$\lambda_0=(\lambda_1\times\lambda_2)/(\lambda_2-\lambda_1) \quad (M1)$$

where $\lambda_2>\lambda_1$.

For example, when $\lambda_1=1500$ nm and $\lambda_2=1503$ nm, $\lambda_0=751.500$ μm according to Expression (M1) given above, and the measurement range is $\lambda_0/2=375.750$ μm.

A more detailed description is given below. According to one or more embodiments, a phase $\phi_1(\xi,\eta)$ of the measurement light with regard to the first light at coordinates $(\xi,\eta)$ on the surface of the work W may be calculated (as shown by [Math. 9] given above), based on the luminance values $I_1(x,y)$, $I_2(x,y)$, $I_3(x,y)$ and $I_4(x,y)$ of four different interference fringe images with regard to the first light having the wavelength $\lambda_1$ (as shown by [Math. 1] given above).

In measurement with regard to the first light, height information $z(\xi,\eta)$ at the coordinates $(\xi,\eta)$ may be expressed by Expression (M2) given below:

$$z(\xi,\eta)=d_1(\xi,\eta)/2=\{\lambda_1\times\phi_1(\xi,\eta)/4\pi\}+\{m_1(\xi,\eta)\times\lambda_1/2\} \quad (M2)$$

where $d_1(\xi,\eta)$ denotes an optical path difference between the measurement light and the reference light of the first light, and $m_1(\xi,\eta)$ denotes a fringe order of the first light.

The phase $\phi(\xi,\eta)$ is accordingly expressed by Expression (M2') given below:

$$\phi_1(\xi,\eta)=(4\pi/\lambda_1)\times z(\xi,\eta)-2\pi m_1(\xi,\eta) \quad (M2')$$

Similarly, a phase $\phi_2(\xi,\eta)$ of the measurement light with regard to the second light at the coordinates $(\xi,\eta)$ on the surface of the work W may be calculated (as shown by [Math. 9] given above), based on the luminance values $I_1(x,y)$, $I_2(x,y)$, $I_3(x,y)$ and $I_4(x,y)$ of four different interference fringe images with regard to the second light having the wavelength $\lambda_2$ (as shown by [Math. 1] given above).

In measurement with regard to the second light, height information $z(\xi,\eta)$ at the coordinates $(\xi,\eta)$ is expressed by Expression (M3) given below:

$$z(\xi,\eta)=d_2(\xi,\eta)/2=\{\lambda_2\times\phi_2(\xi,\eta)/4\pi\}+\{m_2(\xi,\eta)\times\lambda_2/2\} \quad (M3)$$

where $d_2(\xi,\eta)$ denotes an optical path difference between the measurement light and the reference light of the second light, and $m_2(\xi,\eta)$ denotes a fringe order of the second light.

The phase $\phi_2(\xi,\eta)$ is accordingly expressed by Expression (M3') given below:

$$\phi_2(\xi,\eta)=(4\pi/\lambda_2)\times z(\xi,\eta)-2\pi m_2(\xi,\eta) \quad (M3')$$

The fringe order $m_1(\xi,\eta)$ of the first light having the wavelength $\lambda_1$ and the fringe order $m_2(\xi,\eta)$ of the second light having the wavelength $\lambda_2$ may be determined, based on an optical path difference $\Delta d$ and a wavelength difference $\Delta\lambda$ of the two different lights (having the wavelengths $\lambda_1$ and $\lambda_2$). The optical path difference $\Delta d$ and the wavelength difference $\Delta\lambda$ may be respectively expressed by Expressions (M4) and (M5) given below:

$$\Delta d=(\lambda_1\times\phi_1-\lambda_2\times\phi_2)/2\pi \quad (M4)$$

$$\Delta\lambda=\lambda_2-\lambda_1 \quad (M5)$$

where $\lambda_2>\lambda_1$.

In the measurement range of the combined wavelength $\lambda_0$ of the two wavelengths, the relationship between the fringe orders $m_1$ and $m_2$ is classified into the following three cases. Different computation expressions are employed to determine the fringe orders $m_1(\xi,\eta)$ and $m_2(\xi,\eta)$ in the respective cases. The following describes a technique of determining, for example, the fringe order $m_1(\xi,\eta)$. A similar technique may be employed to determine the fringe order $m_2(\xi,\eta)$.

For example, in the case of "$\phi_1-\phi_2<-\pi$", "$m_1-m_2=-1$". In this case, $m_1$ is expressed by Expression (M6) given below:

$$m_1=(\Delta d/\Delta\lambda)-(\lambda_2/\Delta\lambda)=(\lambda_1\times\phi_1-\lambda_2\times\phi_2)/2\pi(\lambda_2-\lambda_1)-\lambda_2/(\lambda_2-\lambda_1) \quad (M6)$$

In the case of "$-\pi<\phi_1-\phi_2<\pi$", "$m_1-m_2=0$". In this case, $m_1$ is expressed by Expression (M7) given below:

$$m_1=\Delta d/\Delta\lambda=(\lambda_1\times\phi_1-\lambda_2\times\phi_2)/2\pi(\lambda_2-\lambda_1) \quad (M7)$$

In the case of "$\phi_1-\phi_2>\pi$", "$m_1-m_2=+1$". In this case, $m_1$ is expressed by Expression (M8) given below:

$$m_1=(\Delta d/\Delta\lambda)+(\lambda_2/\Delta\lambda)=(\lambda_1\times\phi_1-\lambda_2\times\phi_2)/2\pi(\lambda_2-\lambda_1)+\lambda_2/(\lambda_2-\lambda_1) \quad (M8)$$

The height information $z(\xi,\eta)$ can be obtained according to Expression (M2) or Expression (M3) given above, based on the fringe order $m_1(\xi,\eta)$ or $m_2(\xi,\eta)$ thus obtained.

As described above in detail, the configuration of one or more embodiments allows for height measurement beyond the measurement range with regard to each coordinate position in the measurement area on the work W. Furthermore, the configuration of one or more embodiments does not require any large-scaled moving mechanism to move the work W and thereby simplifies the structure. The configuration of one or more embodiments is also not affected by the vibration or the like of such a large-scaled moving mechanism and thereby improves the measurement accuracy.

Moreover, the configuration of one or more embodiments enables all the interference fringe images required for measurement to be obtained by the smaller number of imaging operations and thereby improves the measurement efficiency.

Additionally, the configuration of one or more embodiments does not initially obtain the intensity image data with regard to the entire measurement area of the work W but obtains the intensity image data at the multiple positions in the z direction with regard to only the specific area V that is a preset part in the measurement area. The configuration of one or more embodiments specifies the position in the z direction of the work W based on the focusing state of the obtained intensity image data and subsequently obtains the intensity image data at the multiple positions in the z direction with regard to each coordinate position in the entire measurement area, on the basis of the specified position.

This configuration reduces the load of the process of obtaining the required data for three-dimensional measurement of the measurement area and shortens the time period required for this process. As a result, this configuration improves the measurement accuracy and also improves the measurement efficiency.

One or more embodiments are configured to cause the first light having the wavelength $\lambda_1$ to enter the first surface 20a of the polarizing beam splitter 20 and cause the second light having the wavelength $\lambda_2$ to enter the second surface 20b of the polarizing beam splitter 20. This respectively splits the reference light and the measurement light of the first light and the reference light and the measurement light of the second light into different polarized light components (P-polarized light and S-polarized light). The first light and the second light entering the polarizing beam splitter 20 accordingly do not interfere with each other but are separately emitted from the polarizing beam splitter 20. In other words, there is no need to separate the light emitted from the polarizing beam splitter 20 into the first light and the second light by means of a predetermined separation unit.

As a result, two different lights having wavelengths close to each other may be used as the first light and the second light. This further expands the measurement range in three-dimensional measurement. Additionally, this configuration enables imaging of the output light with regard to the first light to be performed simultaneously with imaging of the output light with regard to the second light. This accordingly shortens the total imaging time and improves the measurement efficiency.

The present invention is not limited to the description of the above embodiments but may also be implemented, for example, by configurations described below. The present invention may further be implemented by other applications and other modifications that are not specifically described below.

(a) The work W as the measured object is not limited to the wafer substrate 100 illustrated in the above embodiments. For example, the work W (measured object) may be a printed circuit board with solder paste printed thereon.

The three-dimensional measurement device 1 may be provided in a bump inspection device or a solder printing inspection device that is equipped with an inspection unit configured to inspect the quality of bumps or solder paste as a measurement object according to quality judgment criteria set in advance.

(b) The embodiments described above employ the phase shift method using multiple image data as the method of reconstruction from interference fringe images (i.e., the method of obtaining the complex amplitude data). This is, however, not restrictive, but another technique may be employed. For example, Fourier transform using one image data may be employed.

The method of reconstruction is also not limited to the technique of reconstruction using the complex amplitude data, but another reconstruction technique may be employed.

Furthermore, the calculation of light propagation is not limited to the convolution method illustrated in the above embodiments, but another technique such as an angular spectrum method may be employed.

(c) The configuration of the interference optical system (the predetermined optical system) is not limited to the configuration of the above embodiments. For example, the above embodiments employ the optical configuration of the Michelson interferometer as the interference optical system. This is, however, not restrictive. Another optical configuration, such as the optical configuration of a Mach-Zehnder interferometer or the optical configuration of a Fizeau interferometer, may be employed to divide the incident light into reference light and measurement light and perform measurement of the work W.

(d) The above embodiments are configured to use the two different lights having different wavelengths for measurement of the work W. This configuration is, however, not restrictive. A modified configuration may use only one light for measurement of the work W.

In the case of using two different lights having different wavelengths, the configuration of the above embodiments is not essential. Like a conventional three-dimensional measurement device, a modification may be configured to cause combined light of first wavelength light and second wavelength light to enter an interference optical system, cause interfering light emitted from the interference optical system to be subjected to wavelength separation by a predetermined optical separation unit (for example, a dichroic mirror) so as to obtain interfering light with regard to the first wavelength light and interfering light with regard to the second wavelength light, and perform measurement of the work W, based on interference fringe images obtained by individually taking images of the interfering lights with regard to the respective wavelength lights.

Another modification may combine a configuration of causing two different lights that are emitted from two light sources, that have different wavelengths and that are overlapped with each other to enter an interference optical system, causing light emitted from the interference optical system to be subjected to wavelength separation by an optical separation unit, and individually taking images of the interfering lights with regard to the respective wavelength lights, with the configuration of the above embodiments to perform measurement of the work W by using three or more different lights having different wavelengths.

(e) The configuration of the projection optical systems 2A and 2B is not limited to the configuration of the above embodiments. For example, the above embodiments illustrate the configuration of causing the light having the wavelength $\lambda_1$=1500 nm to be radiated from the first projection optical system 2A and causing the light having the wavelength $\lambda_2$=1503 nm to be radiated from the second projection optical system 2B. The wavelengths of the respective lights are not limited to those described in the above embodiments. However, the wavelength difference between the two lights may be further reduced with a view to expanding the measurement range.

(f) The above embodiments are configured to obtain the four different interference fringe images having the phases that differ by 90 degrees each, with regard to both the first light and the second light. The number of phase shifts and the amount of phase shift are not limited to those described in the above embodiments. For example, a modification may be configured to obtain three different interference fringe images having phases that differ by 120 degrees (or 90 degrees) each and perform measurement of the work W.

(g) The above embodiments employ the polarizers 32A and 32B configured to change the transmission axis direction, as the phase shift unit. The configuration of the phase shift unit is, however, not limited to the embodiments.

For example, a modification may employ a configuration that moves the reference surface 23 along the optical axis by means of a piezoelectric element or the like, so as to physically change the optical path length.

This modified configuration and the configuration of the above embodiments require a certain time period to obtain all the interference fringe images required for the measurement. These configurations increase the measurement time and are likely to have the lowered measurement accuracy due to the possible effects of the fluctuation and the vibration of the air and the like.

According to a modification, for example, the first imaging system 4A may include a spectroscopic unit (for example, a prism) configured to split the combined light (reference light component and measurement light component) of the first light transmitted through the quarter wave plate 31A into four lights; and a filter unit configured as the phase shift unit in place of the first polarizer 32A to provide the four lights emitted from the spectroscopic unit with respectively different phase differences and may be configured to simultaneously take images of the four lights transmitted through the filter unit by means of the first camera 33A (or by a plurality of cameras). A similar configuration may also be employed for the second imaging system 4B.

This modified configuration enables all the interference fringe images required for the measurement to be obtained simultaneously. More specifically, this modified configuration enables a total of eight different interference fringe images with regard to the two different lights to be obtained simultaneously. As a result, this improves the measurement accuracy and significantly shortens the total imaging time so as to remarkably improve the measurement efficiency.

(h) The above embodiments are configured to obtain the complex amplitude data or the like at the measurement range intervals of height measurement in the process of determining the position of the work W in the z direction (the optimum focusing position of the specific area V). This configuration is, however, not essential. For example, a modification may be configured to obtain the complex amplitude data or the like at focusing range intervals.

(i) The above embodiments are configured to perform three-dimensional measurement at step S10, based on the complex amplitude data of the entire measurement area obtained at step S6. A modification may be configured to additionally obtain intensity images of the entire measurement area and perform two-dimensional measurement, based on the complex amplitude data of the entire measurement area obtained at step S6.

In the case of obtaining the intensity images of the entire measurement area, an employable procedure may use different data according to a difference in focusing position in the optical axis direction at each coordinate position in the measurement area; for example, use data at a first position in the optical axis direction with regard to a first area and use data at a second position in the optical axis direction with regard to a second area. Even in the case where the measurement area has a variation in height, due to, for example, a warp of the measured object or inclination of the measured object, this procedure enables the intensity images focused in the entire measurement area to be obtained.

Figure 10:
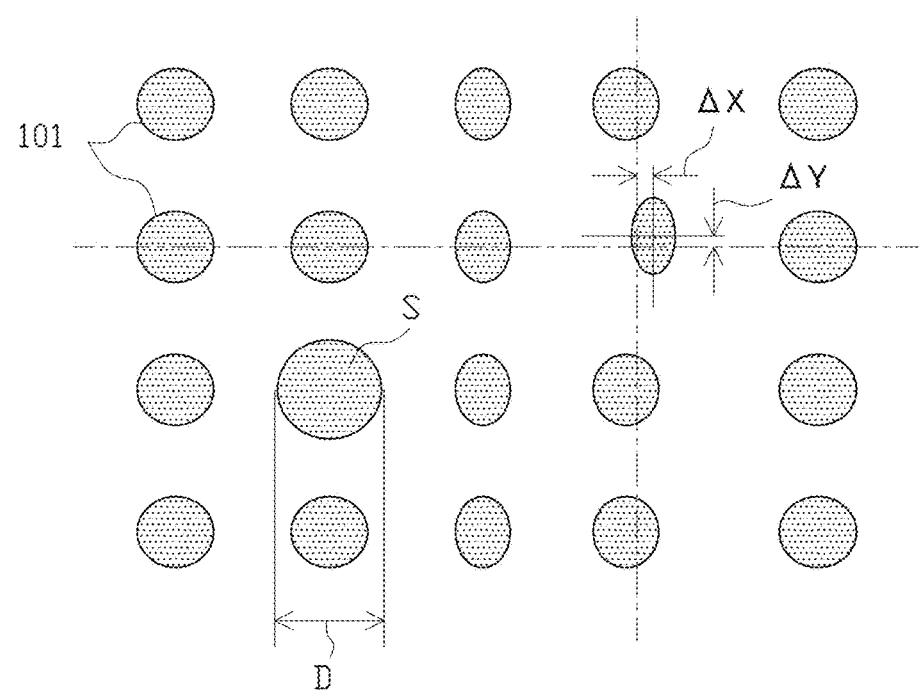
FIG. 10 is a schematic diagram illustrating two-dimensional measurement of bumps according to one or more embodiments.

In the case of performing the two-dimensional measurement, a two-dimensional inspection may be performed, based on the results of this measurement. For example, a procedure of the two-dimensional inspection may compare positional misalignments $\Delta x$ and $\Delta y$, an outer diameter D and an area S of a bump 101 (shown in FIG. 10) specified as a measurement object with preset reference values and determine whether the results of the comparison are within an allowable range, so as to determine the good/poor quality of the bump 101.

In the case of performing both the two-dimensional measurement and the three-dimensional measurement at step S10, a comprehensive inspection may be performed by combination of multiple different types of measurements: for example, specifying a location where the bump 101 as a measurement object is present, based on the results of the two-dimensional measurement (two-dimensional inspection) and subsequently performing a three-dimensional inspection; or mapping intensity images to three-dimensional data obtained by the three-dimensional measurement.

(j) The above embodiments use the cameras equipped with lenses. The lens is, however, not essential. A focused image may be obtained by calculation according to the above embodiments, even when a camera without lens is used.

(k) The above embodiments are configured to specify the optimum focusing position with regard to the specific area V that is a preset part in the measurement area of the work W, i.e., the position in the z direction of the work W, to subsequently obtain the complex amplitude data and the intensity image data at multiple positions in the z direction of the entire measurement area, based on the specified position, and to perform the measurement.

This configuration is, however, not restrictive. A modification may omit the process of specifying the optimum focusing position with regard to the specific area V and may be configured to directly obtain complex amplitude data and intensity image data at multiple positions in the z direction with regard to each coordinate position in the entire measurement area of the work W, on the basis of the device origin of the three-dimensional measurement device 1 and perform the measurement.

(l) The above embodiments are configured to obtain the intensity image data at the multiple positions in the z direction at each interval of one period of the measurement range and determine the focusing state. This configuration may be replaced by a modified configuration of obtaining intensity image data at multiple positions in the z direction at each interval of n periods (where n denotes a natural number equal to or larger than 2) of the measurement range and determining the focusing state.

For example, like a concrete example shown in FIG. 12, the modified configuration may obtain intensity image data at multiple positions in the z direction at each interval of two periods of the measurement range and determine the focusing state.

In "Case 1" shown in FIG. 12, among intensity image data reconstructed at height positions $H_3$, $H_1$, $H_{-1}$ and $H_{-3}$ (reconstructed images [1] to [4]) with regard to a predetermined coordinate position, the intensity image data reconstructed at the height position $H_3$ (reconstructed image [1]) has a maximum luminance value of "135". Accordingly, the height position $H_3$ is specified as the optimum focusing position with regard to this coordinate position.

Similarly, in "Case 2" shown in FIG. 12, among intensity image data reconstructed at height positions $H_3$, $H_1$, $H_{-1}$ and $H_{-3}$ (reconstructed images [1] to [4]) with regard to a predetermined coordinate position, the intensity image data reconstructed at the height position $H_1$ (reconstructed image [2]) has a maximum luminance value of "128". Accordingly, the height position $H_1$ is specified as the optimum focusing position with regard to this coordinate position.

A modified configuration may be configured to determine interpolated data with regard to height positions $H_2$, $H_0$ and $H_{-2}$, based on the intensity image data reconstructed at the height positions $H_3$, $H_1$, $H_{-1}$ and $H_{-3}$ (reconstructed images [1] to [4]) and specify the maximum focusing position, based on the interpolated data as well as the intensity image data.

The above embodiments are configured to obtain the intensity image data at multiple positions in the z direction with regard to each coordinate position in the measurement area, determine a focusing state of the obtained intensity image data and perform the measurement. This configuration is, however, not restrictive. A modification may be configured to obtain intensity image data at one predetermined position in the z direction with regard to each coordinate position in the measurement area and determine a focusing state of the obtained intensity image data (focusing determination unit). When the obtained intensity image data is in a predetermined focusing state that satisfies a predetermined condition (for example, when the intensity image data has a luminance value that is equal to or higher than a predetermined reference value), the modification may be configured to perform three-dimensional measurement with regard to the coordinate position, based on phase information of light determined from complex amplitude data with regard to the predetermined position in the z direction and an order corresponding to the predetermined position in the z direction.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . three-dimensional measurement device, 2A . . . first projection optical system, 2B . . . second projection optical system, 3 . . . interference optical system, 4A . . . first imaging system, 4B . . . second imaging system, 5 . . . control device, 11A . . . first light emitter, 11B . . . second light emitter, 12A . . . first light isolator, 12B . . . second light isolator, 13A . . . first non-polarizing beam splitter, 13B . . . second non-polarizing beam splitter, 20 . . . polarizing beam splitter, 20a . . . first surface, 20c . . . third surface, 20b . . . second surface, 20d . . . fourth surface, 21, 22 . . . quarter wave plates, 23 . . . reference surface, 24 . . . placement structure, 31A . . . quarter wave plate, 31B . . . quarter wave plate, 32A . . . first polarizer, 32 . . . second polarizer, 33A . . . first camera, 33B . . . second camera, 33Aa, 33Ba . . . imaging elements, 100 . . . wafer substrate, 101 . . . bump, 102 . . . pattern portion, R . . . measurement range interval, V . . . specific area, W . . . work

The invention claimed is:

1. A three-dimensional measurement device, comprising:
 a predetermined optical system that splits predetermined incident light into two lights, radiates one of the two lights as measurement light to a measured object and the other of the two lights as reference light to a reference surface, and recombines the two lights into combined light to emit the combined light;
 a light emitter that emits predetermined light entering the predetermined optical system;
 an imaging system that takes an image of output light emitted from the predetermined optical system; and
 an image processor that performs three-dimensional measurement of a predetermined measurement area of the measured object based on an interference fringe image obtained by the imaging system, wherein the image processor further:

obtains intensity image data at a predetermined position along an optical axis direction at each coordinate position in the measurement area by reconstruction based on an interference fringe image of the measurement area obtained by the imaging system;

obtains phase information of light at the predetermined position along the optical axis direction at each coordinate position in the measurement area by reconstruction based on the interference fringe image of the measurement area obtained by the imaging system;

determines whether the intensity image data is in a focusing state that satisfies a predetermined condition based on intensity image data at a predetermined position along the optical axis direction at a predetermined coordinate position in the measurement area;

specifies an order corresponding to the predetermined position along the optical axis direction, as an order of the predetermined coordinate position, among orders determined at a predetermined measurement range interval along the optical axis direction, upon determining that the intensity image data at the predetermined position along the optical axis direction at the predetermined coordinate position is in the focusing state; and performs three-dimensional measurement of the predetermined coordinate position based on phase information of the predetermined coordinate position and the order of the predetermined coordinate position.

2. A three-dimensional measurement device, comprising:

a predetermined optical system that splits predetermined incident light into two lights, radiates one of the two lights as measurement light to a measured object and the other of the two lights as reference light to a reference surface, and recombines the two lights into combined light to emit the combined light;

a light emitter that emits predetermined light entering the predetermined optical system;

an imaging system that takes an image of output light emitted from the predetermined optical system; and an image processor that performs three-dimensional measurement of a predetermined measurement area of the measured object based on an interference fringe image obtained by the imaging system, wherein the image processor further:

obtains multiple sets of intensity image data at predetermined positions along an optical axis direction at each coordinate position in the measurement area by reconstruction based on an interference fringe image of the measurement area obtained by the imaging system, wherein the multiple sets of the intensity image data are obtained at a predetermined measurement range interval of n period in at least a predetermined range along the optical axis direction, where n is a natural number equal to or greater than 1;

determines a predetermined focusing position along the optical axis direction at a predetermined coordinate position in the measurement area based on the multiple sets of the intensity image data at the predetermined coordinate position;

specifies an order corresponding to the focusing position along the optical axis direction at the predetermined coordinate position, as an order of the predetermined coordinate position, among orders determined at the measurement range interval along the optical axis direction;

obtains phase information of light at the predetermined positions along the optical axis direction at each coordinate position in the measurement area by reconstruction based on the interference fringe image of the measurement area obtained by the imaging system; and performs three-dimensional measurement of the predetermined coordinate position based on phase information of the predetermined coordinate position and the order of the predetermined coordinate position.

3. A three-dimensional measurement device, comprising:

a predetermined optical system that splits predetermined incident light into two lights, radiates one of the two lights as measurement light to a measured object and the other of the two lights as reference light to a reference surface, and recombines the two lights into combined light to emit the combined light;

a light emitter that emits predetermined light entering the predetermined optical system;

an imaging system that takes an image of output light emitted from the predetermined optical system; and an image processor that performs three-dimensional measurement of a predetermined measurement area of the measured object based on an interference fringe image obtained by the imaging system, wherein the image processor further:

obtains multiple sets of intensity image data at predetermined positions along an optical axis direction in a specific area preset in the measurement area by reconstruction based on the interference fringe image obtained by the imaging system, wherein the multiple sets of the intensity image data are obtained at a predetermined measurement range interval of n period in at least a first range along the optical axis direction, where n is a natural number equal to or greater than 1;

determines a predetermined focusing position along the optical axis direction in the specific area based on the multiple sets of the intensity image data in the specific area;

obtains multiple sets of intensity image data at predetermined positions along the optical axis direction at each coordinate position in the measurement area by reconstruction based on the interference fringe image of the measurement area obtained by the imaging system, wherein the multiple sets of the intensity image data are obtained at a predetermined measurement range interval of n period in at least a second range along the optical axis direction that is set based on the focusing position along the optical axis direction in the specific area, where n is a natural number equal to or greater than 1;

determines a predetermined focusing position along the optical axis direction at a predetermined coordinate position in the measurement area based on the multiple sets of the intensity image data at the predetermined coordinate position;

specifies an order corresponding to the focusing position along the optical axis direction at the predetermined coordinate position, as an order of the predetermined coordinate position, among orders determined at the measurement range interval along the optical axis direction;

obtains phase information of light at the predetermined positions along the optical axis direction at each coordinate position in the measurement area by reconstruction based on the interference fringe image of the measurement area obtained by the imaging system; and performs three-dimensional measurement of the predetermined coordinate position based on phase information of the predetermined coordinate position and the order of the predetermined coordinate position.

4. The three-dimensional measurement device according to claim 1, wherein the reconstruction is performed by obtaining complex amplitude data at the predetermined position along the optical axis direction based on the interference fringe image.

5. The three-dimensional measurement device according to claim 2, wherein the reconstruction is performed by obtaining complex amplitude data at the predetermined positions along the optical axis direction based on the interference fringe image.

6. The three-dimensional measurement device according to claim 3, wherein the reconstruction is performed by obtaining complex amplitude data at the predetermined positions along the optical axis direction based on the interference fringe image.

7. The three-dimensional measurement device according to claim 1, further comprising:
a polarizer that performs a phase shift and provides a relative phase difference between the reference light and the measurement light, wherein
the image processor performs measurement of a predetermined measurement area of the measured object based on multiple interference fringe images obtained, by the imaging system, by taking images of the output light subjected to a plurality of kinds of phase shifts by the polarizer.

8. The three-dimensional measurement device according to claim 2, further comprising:
a polarizer that performs a phase shift and provides a relative phase difference between the reference light and the measurement light, wherein
the image processor performs measurement of a predetermined measurement area of the measured object based on multiple interference fringe images obtained, by the imaging system, by taking images of the output light subjected to a plurality of kinds of phase shifts by the polarizer.

9. The three-dimensional measurement device according to claim 3, further comprising:
a polarizer that performs a phase shift and provides a relative phase difference between the reference light and the measurement light, wherein
the image processor performs measurement of a predetermined measurement area of the measured object based on multiple interference fringe images obtained, by the imaging system, by taking images of the output light subjected to a plurality of kinds of phase shifts by the polarizer.

10. The three-dimensional measurement device according to claim 1,
wherein the light emitter comprises:
a first light emitter that emits first light including polarized light of a first wavelength and entering the predetermined optical system; and
a second light emitter that emits second light including polarized light of a second wavelength and entering the predetermined optical system, and
the imaging system comprises:
a first imaging system that takes an image of output light with regard to the first light that is emitted from the predetermined optical system once the first light enters the predetermined optical system; and
a second imaging system that takes an image of output light with regard to the second light that is emitted from the predetermined optical system once the second light enters the predetermined optical system.

11. The three-dimensional measurement device according to claim 2,
wherein the light emitter comprises:
a first light emitter that emits first light including polarized light of a first wavelength and entering the predetermined optical system; and
a second light emitter that emits second light including polarized light of a second wavelength and entering the predetermined optical system, and
the imaging system comprises:
a first imaging system that takes an image of output light with regard to the first light that is emitted from the predetermined optical system once the first light enters the predetermined optical system; and
a second imaging system that takes an image of output light with regard to the second light that is emitted from the predetermined optical system once the second light enters the predetermined optical system.

12. The three-dimensional measurement device according to claim 3,
wherein the light emitter comprises:
a first light emitter that emits first light including polarized light of a first wavelength and entering the predetermined optical system; and
a second light emitter that emits second light including polarized light of a second wavelength and entering the predetermined optical system, and
the imaging system comprises:
a first imaging system that takes an image of output light with regard to the first light that is emitted from the predetermined optical system once the first light enters the predetermined optical system; and
a second imaging system that takes an image of output light with regard to the second light that is emitted from the predetermined optical system once the second light enters the predetermined optical system.

13. The three-dimensional measurement device according to claim 1, wherein the measured object is a wafer substrate on which a bump is formed.

14. The three-dimensional measurement device according to claim 2, wherein the measured object is a wafer substrate on which a bump is formed.

15. The three-dimensional measurement device according to claim 3, wherein the measured object is a wafer substrate on which a bump is formed.

16. The three-dimensional measurement device according to claim 4, further comprising:
a polarizer that performs a phase shift and provides a relative phase difference between the reference light and the measurement light, wherein
the image processor performs measurement of a predetermined measurement area of the measured object based on multiple interference fringe images obtained, by the imaging system, by taking images of the output light subjected to a plurality of kinds of phase shifts by the polarizer.

17. The three-dimensional measurement device according to claim 5, further comprising:
  a polarizer that performs a phase shift and provides a relative phase difference between the reference light and the measurement light, wherein
  the image processor performs measurement of a predetermined measurement area of the measured object based on multiple interference fringe images obtained, by the imaging system, by taking images of the output light subjected to a plurality of kinds of phase shifts by the polarizer.

18. The three-dimensional measurement device according to claim 6, further comprising:
  a polarizer that performs a phase shift and provides a relative phase difference between the reference light and the measurement light, wherein
  the image processor performs measurement of a predetermined measurement area of the measured object based on multiple interference fringe images obtained, by the imaging system, by taking images of the output light subjected a plurality of kinds of phase shifts by the polarizer.

19. The three-dimensional measurement device according to claim 4,
  wherein the light emitter comprises:
    a first light emitter that emits first light including polarized light of a first wavelength and entering the predetermined optical system; and
    a second light emitter that emits second light including polarized light of a second wavelength and entering the predetermined optical system, and
  the imaging system comprises:
    a first imaging system that takes an image of output light with regard to the first light that is emitted from the predetermined optical system once the first light enters the predetermined optical system; and
    a second imaging system that takes an image of output light with regard to the second light that is emitted from the predetermined optical system once the second light enters the predetermined optical system.

20. The three-dimensional measurement device according to claim 5,
  wherein the light emitter comprises:
    a first light emitter that emits first light including polarized light of a first wavelength and entering the predetermined optical system; and
    a second light emitter that emits second light including polarized light of a second wavelength and entering the predetermined optical system, and
  the imaging system comprises:
    a first imaging system that takes an image of output light with regard to the first light that is emitted from the predetermined optical system once the first light enters the predetermined optical system; and
    a second imaging system that takes an image of output light with regard to the second light that is emitted from the predetermined optical system once the second light enters the predetermined optical system.

21. The three-dimensional measurement device according to claim 6,
  wherein the light emitter comprises:
    a first light emitter that emits first light including polarized light of a first wavelength and entering the predetermined optical system; and
    a second light emitter that emits second light including polarized light of a second wavelength and entering the predetermined optical system, and
  the imaging system comprises:
    a first imaging system that takes an image of output light with regard to the first light that is emitted from the predetermined optical system once the first light enters the predetermined optical system; and
    a second imaging system that takes an image of output light with regard to the second light that is emitted from the predetermined optical system once the second light enters the predetermined optical system.

22. The three-dimensional measurement device according to claim 4, wherein the measured object is a wafer substrate on which a bump is formed.

23. The three-dimensional measurement device according to claim 5, wherein the measured object is a wafer substrate on which a bump is formed.

24. The three-dimensional measurement device according to claim 6, wherein the measured object is a wafer substrate on which a bump is formed.

* * * * *